(12) United States Patent
    Kibune

(10) Patent No.: US 12,493,436 B2
(45) Date of Patent: Dec. 9, 2025

(54) IMAGE PROCESSING SYSTEM, CONTROL APPARATUS, AND NON-TRANSITORY COMPUTER-READABLE STORAGE MEDIUM STORING PROGRAM

(71) Applicant: SEIKO EPSON CORPORATION, Tokyo (JP)

(72) Inventor: Shusuke Kibune, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/586,871

(22) Filed: Feb. 26, 2024

(65) Prior Publication Data
    US 2024/0289072 A1    Aug. 29, 2024

(30) Foreign Application Priority Data

Feb. 27, 2023    (JP) .................................. 2023-028139
Mar. 24, 2023    (JP) .................................. 2023-047622

(51) Int. Cl.
    *G06F 3/12*    (2006.01)
(52) U.S. Cl.
    CPC ............ *G06F 3/124* (2013.01); *G06F 3/1204* (2013.01)
(58) Field of Classification Search
    None
    See application file for complete search history.

(56) References Cited

U.S. PATENT DOCUMENTS

2012/0224217 A1*    9/2012    Oba ..................... G06F 3/1288
                                                                    358/1.15
2020/0082233 A1*    3/2020    Kumahashi ............ G06F 3/128

FOREIGN PATENT DOCUMENTS

JP    2007-310450 A    11/2007

* cited by examiner

*Primary Examiner* — Frantz Bataille
(74) *Attorney, Agent, or Firm* — WORKMAN NYDEGGER

(57) ABSTRACT

An image processing system includes a control unit configured to control distributed processing in which a plurality of image processing units distributively perform a plurality of pieces of image processing for performing printing by a printing apparatus, in which the control unit acquires the number of assignments, which is a unit number of pieces of image processing assigned to each of the image processing units, from a plurality of apparatuses including the image processing units, determines, based on the number of assignments, a combination of a plurality of the image processing units in charge of the distributed processing, and controls the determined image processing units to execute the distributed processing.

7 Claims, 14 Drawing Sheets

FIG. 4

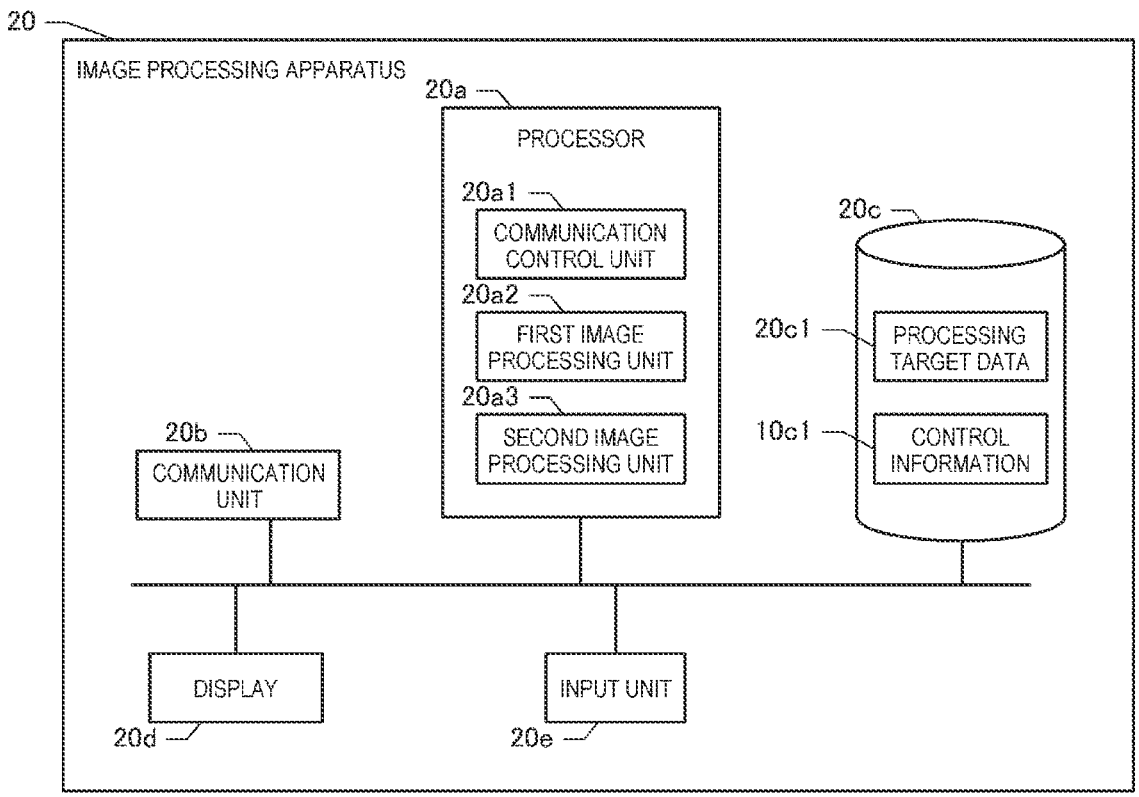

FIG. 5

| PARAMETER | COLOR | SINGLE-SIDED/<br>DOUBLE-SIDED | TYPE OF<br>PRINT MEDIUM | PRINT<br>SIZE | PRINT<br>QUALITY | NUMBER<br>OF COPIES |
|---|---|---|---|---|---|---|
| ROUTE<br>INFORMATION | /IP ADDRESS OF CONTROL APPARATUS/.../STATUS DATA STORAGE FOLDER/<br>/IP ADDRESS OF IMAGE PROCESSING APPARATUS/.../FIRST MONITORED FOLDER/<br>/IP ADDRESS OF IMAGE PROCESSING APPARATUS/.../SECOND MONITORED FOLDER/<br>/IP ADDRESS OF IMAGE PROCESSING APPARATUS/.../PRINT MONITORED FOLDER/ | | | | | |
| STORAGE<br>LOCATION OF<br>INPUT DATA | /IP ADDRESS OF IMAGE PROCESSING APPARATUS/.../FIRST MONITORED FOLDER/ | | | | | |

IMAGE PROCESSING SYSTEM, CONTROL APPARATUS, AND NON-TRANSITORY COMPUTER-READABLE STORAGE MEDIUM STORING PROGRAM

The present application is based on, and claims priorities from JP Application Serial Number 2023-028139, filed Feb. 27, 2023 and JP Application Serial Number 2023-047622, filed Mar. 24, 2023, the disclosures of which are hereby incorporated by reference herein in its entirety.

BACKGROUND

1. Technical Field

The disclosure relates to an image processing system, a control apparatus, and a non-transitory computer-readable storage medium storing a program.

2. Related Art

In related art, there is known a technique that speeds up image processing for printing. For example, JP-A-2007-310450 discloses a technique in which a print manager distributes a job to a plurality of raster image processors (RIP) according to job contents to perform parallel processing.

JP-A-2007-310450 is an example of the related art.

In the related art, the manager assigns the job to image processing apparatuses, thereby implementing distributed processing in which the image processing apparatuses to which the job is assigned execute RIP processing simultaneously in parallel. There is a need for a user to assign image processing apparatuses in charge of such distributed processing, but it is difficult to assign an appropriate image processing apparatus to a printing apparatus that prints data after image processing.

SUMMARY

In order to solve the above-described problems, an image processing system includes a control unit configured to control distributed processing in which a plurality of image processing units distributively perform a plurality of pieces of image processing for performing printing by a printing apparatus, in which the control unit acquires the number of assignments, which is a unit number of pieces of image processing assigned to each of the image processing units, from a plurality of apparatuses including the image processing units, determines, based on the number of assignments, a combination of a plurality of the image processing units in charge of the distributed processing, and controls the determined image processing units to execute the distributed processing.

A control apparatus includes a control unit configured to control distributed processing in which a plurality of image processing units distributively perform a plurality of pieces of image processing for performing printing by a printing apparatus, in which the control unit acquires the number of assignments, which is a unit number of pieces of image processing assigned to each of the image processing units, from a plurality of apparatuses including the image processing units, determines, based on the number of assignments, a plurality of the image processing units in charge of the distributed processing, and controls the determined image processing units to execute the distributed processing.

A non-transitory computer-readable storage medium stores a program executed by a computer of a control apparatus that controls distributed processing in which a plurality of image processing units distributively perform a plurality of pieces of image processing for performing printing by a printing apparatus. The program causes the computer to: acquire the number of assignments, which is a unit number of pieces of image processing assigned to each of the image processing units, from a plurality of apparatuses including the image processing units; determine, based on the number of assignments, a plurality of the image processing units in charge of the distributed processing; and control the determined image processing units to execute the distributed processing.

BRIEF DESCRIPTION OF THE DRAWINGS

FIG. 4 is a block diagram of an image processing apparatus.
FIG. 5 shows control information.

DESCRIPTION OF EMBODIMENTS

Here, an embodiment of the disclosure will be described according to the following order.
(1) Configuration of Image Processing System:
(1-1) Configuration of Printing Apparatus:
(1-2) Configuration of Control Apparatus:
(1-3) Configuration of Image Processing Apparatus:
(2) Control Information:
(3) Image Processing:
(4) Print Data Processing:
(5) Image Processing Example:
(6) Assignment of Image Processing:
(7) Print Route Determination Processing:
(8) License:
(9) Appendix:

(1) CONFIGURATION OF IMAGE PROCESSING SYSTEM

Figure 1:
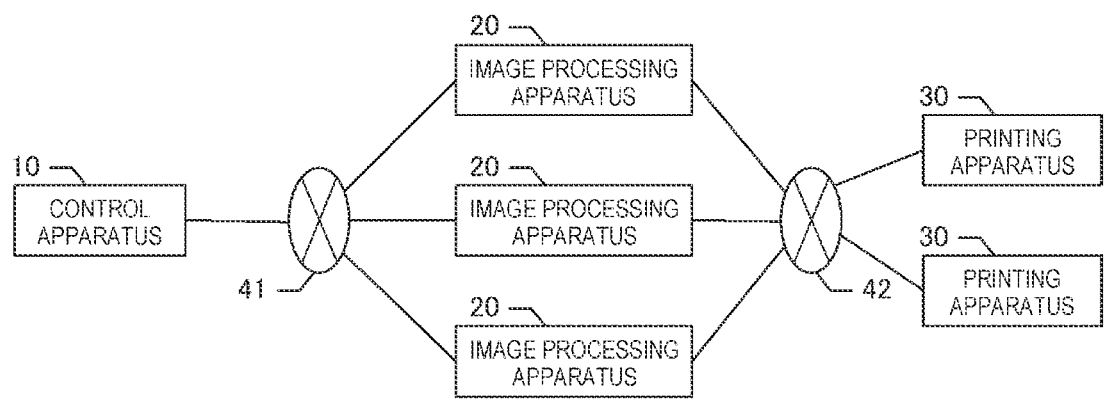
FIG. 1 is a block diagram of an image processing system.

FIG. 1 shows an example of an image processing system 1 according to an embodiment of the disclosure. The image processing system 1 includes a control apparatus 10, image processing apparatuses 20, and printing apparatuses 30. The apparatuses are connected via a network. In the embodiment, the control apparatus 10 is connected to three image processing apparatuses 20 via a first local network 41. The image processing apparatus 20 and the printing apparatus 30 are connected via a second local network 42 or local connection such as a USB.

However, a connection mode of each apparatus is not limited to that in the embodiment. The control apparatus 10 only needs to be directly connected to at least one image processing apparatus 20 provided in the image processing system 1, and may be indirectly connected to another image processing apparatus 20 or the printing apparatus 30 via another apparatus. For example, a part of the image processing apparatus 20 may be connected, via the second local network 42, to the image processing apparatus 20 connected to the control apparatus 10 via the first local network 41, and may further be connected to the printing apparatus 30 via a third local network (not shown). As another example, all control apparatuses 10, all image processing apparatuses 20, and all printing apparatuses 30 provided in the image processing system 1 may be connected to the same local network. In FIG. 1, one control apparatus 10, three image processing apparatuses 20, and two printing apparatuses 30 are shown as an example, and the number of such apparatuses is not limited to the number shown in FIG. 1. The image processing system 1 may include two or more control apparatuses 10.

The image processing system 1 is a system used for image processing in order to execute printing related to a print job using one or more printing apparatuses 30. When printing is executed in each printing apparatus 30, in the image processing apparatus 20, for example, image data such as portable document format (PDF) data is specified as a print target, and image processing is performed based on the image data. For example, raster image processor (RIP) processing, which is processing of converting an object into raster data based on a printing apparatus description language provided in PDF data, scaling processing, color conversion processing, page layout determination processing on a print medium, and halftone processing are executed.

In commercial printing, since a data amount of print target data may be fairly large, such image processing may be high load processing. Accordingly, for example, when a plurality of print jobs are executed in parallel by the printing apparatus 30, the image processing may be a bottleneck of an entire printing operation. In the image processing system 1 in the embodiment, the plurality of image processing apparatuses 20, which perform a plurality of pieces of image processing for the printing apparatuses 30 to perform printing, perform the processing distributively. Such processing is referred to as distributed processing. Hereinafter, a configuration of each apparatus provided in the image processing system 1 will be described.

Figure 2:
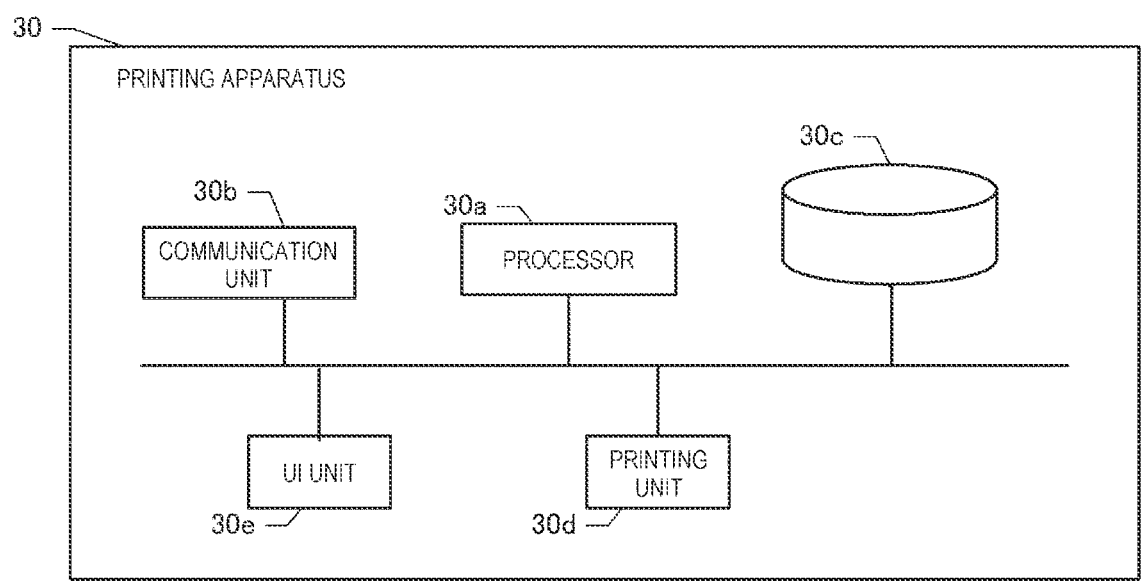
FIG. 2 is a block diagram of a printing apparatus.

(1-1) Configuration of Printing Apparatus:

FIG. 2 is a block diagram showing a configuration of the printing apparatus 30. The printing apparatus 30 includes a processor 30a, a communication unit 30b, a nonvolatile memory 30c, a printing unit 30d, and a UI unit 30e. The processor 30a includes a CPU, a ROM, a RAM, and the like (not shown), and can execute various programs recorded in the nonvolatile memory 30c to control each unit of the printing apparatus 30.

The processor 30a may be implemented by a single chip, may be implemented by a plurality of chips, or may be implemented as an SoC with various functional blocks. For example, an ASIC may be adopted instead of the CPU, or the CPU and the ASIC may cooperate with each other. When each apparatus in the embodiment includes a processor, the processor can be implemented in various forms similar to that of the processor 30a.

The communication unit 30b includes a communication interface for communicating with an external device according to various communication protocols. The printing apparatus 30 can communicate with the image processing apparatus 20 through the communication unit 30b. Of course, the printing apparatus 30 may be communicable with the control apparatus 10. The communication unit 30b may include an interface for communicating with various removable memories mounted on the printing apparatus 30.

The printing unit 30d is a unit configured to execute printing to print contents on a print medium. A printing method is not limited, and various methods such as an ink jet method, a toner method, and a sublimation method can be adopted. The print medium is not limited to print paper and may be various print media such as cloth, ceramic, and resin. The printing unit 30d includes an actuator and various apparatuses, a sensor, a drive circuit, a mechanical component, and the like for printing on various media.

The UI unit 30e includes at least one of a touch panel display, various keys, a switch, an LED, and the like. The touch panel display includes a display panel that displays various types of information such as a status of the printing apparatus 30 and a remaining amount of ink, and a touch detection panel overlaid at the display panel, and detects a touch operation. The LED performs display in terms of lighting or blinking to indicate the status of the printing apparatus 30, or the like. The processor 30a can acquire operation contents of a user via the UI unit 30e. The processor 30a can also display various types of information on a display of the UI unit 30e to notify the user of the information.

In the embodiment, the printing apparatus 30 can print based on print data transmitted from the image processing apparatus 20. That is, the processor 30a acquires the print data from the image processing apparatus 20 via the communication unit 30b and controls the printing unit 30d based on the print data to perform printing.

Figure 3:
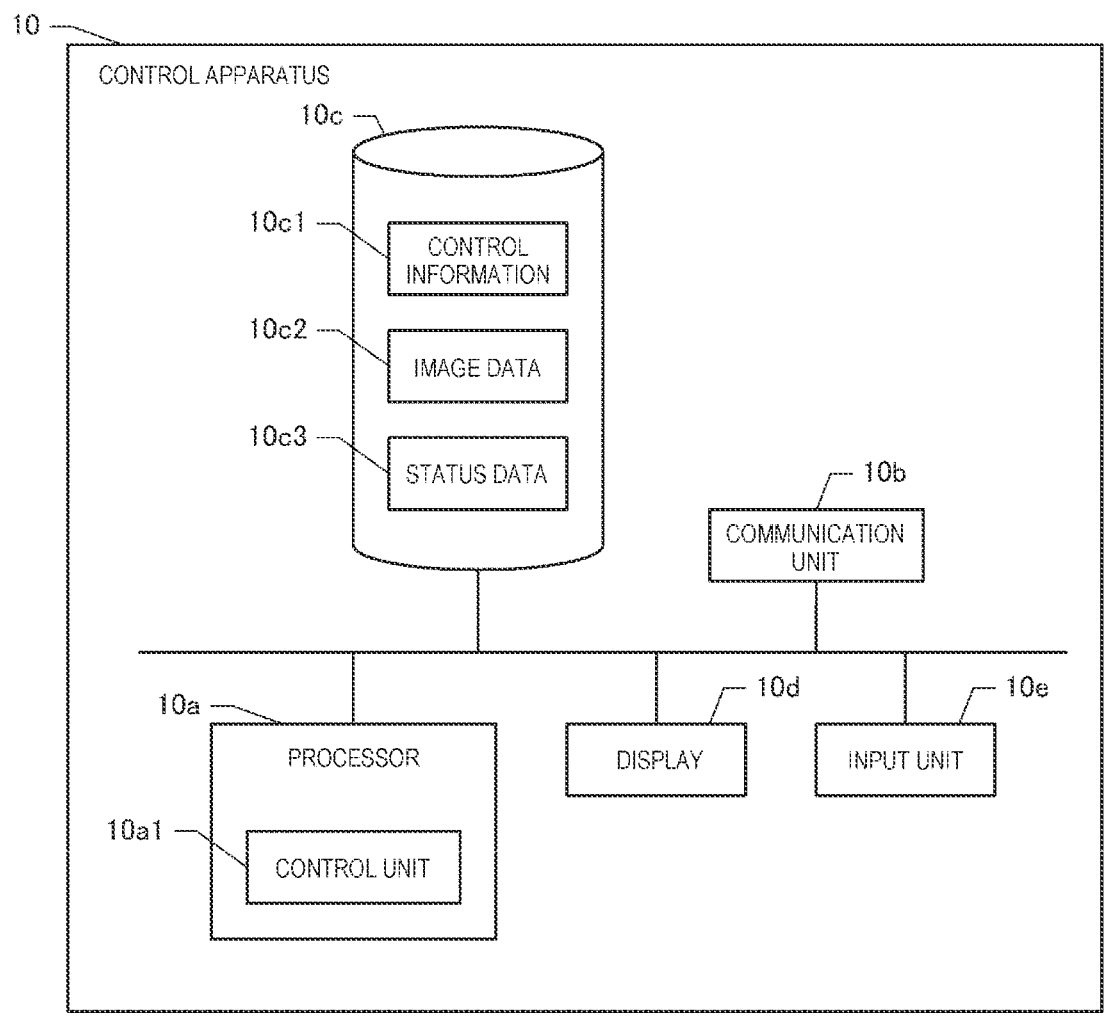
FIG. 3 is a block diagram of a control apparatus.

(1-2) Configuration of Control Apparatus:

FIG. 3 is a block diagram showing a configuration of the control apparatus 10. The control apparatus 10 includes a processor 10a, a communication unit 10b, a nonvolatile memory 10c, a display 10d, and an input unit 10e. The processor 10a includes a CPU, a ROM, a RAM, and the like (not shown), and can execute various programs recorded in the nonvolatile memory 10c to control each unit of the control apparatus 10.

The communication unit 10b includes a communication interface for communicating with an external device according to various communication protocols. The control apparatus 10 can communicate with the image processing apparatus 20 via the communication unit 10b. Of course, the control apparatus 10 may be communicable with the printing apparatus 30. The communication unit 10b may include an interface for communicating with various removable memories mounted on the control apparatus 10.

The display 10d is a display unit that displays any image. The input unit 10e is an apparatus through which the user performs an input operation, and includes, for example, a keyboard and a mouse. In the embodiment, it is assumed that the control apparatus 10 is a stationary terminal, and of course, the control apparatus 10 may be a terminal of another form. For example, the control apparatus 10 may be a tablet terminal or a smartphone terminal. When the control apparatus 10 is such a terminal, the input unit 10e may be implemented by a touch panel or the like. In any case, the user can input an intention of the user by operating the input unit 10e while visually recognizing an image or a character displayed on the display 10d.

Control information 10c1, image data 10c2, and status data 10c3 are stored in the nonvolatile memory 10c of the control apparatus 10. The control information 10c1 is information for specifying the image data 10c2 which is a print target, the image processing apparatus 20 which is to execute image processing after start of printing, and the printing apparatus which is to execute printing. Specifically, the information for specifying the image processing apparatus 20 which is to execute the image processing is information for specifying an image processing unit which is to execute the image processing, and a specific example will be described later. The image data 10c2 is image data indicating print contents, and is, for example, PDF data. In the embodiment, the control information 10c1 and the image data 10c2 are sequentially transferred as a set to the image processing apparatus 20, whereby the image processing is sequentially performed. The image processing apparatus 20 which is to execute the image processing can be specified based on the control information 10c1. With this configuration, the control apparatus 10 does not need to manage the image processing apparatus 20 that is an execution target after the start of printing, and thus a management load on the control apparatus 10 is reduced. The control information 10c1 is information used to reduce such a management load and will be described in detail later.

The status data 10c3 is information indicating a progress of the image processing. In the embodiment, when each image processing unit provided in the image processing apparatus 20 starts processing and when the processing ends, information indicating the start and the end is transmitted to the control apparatus 10. The transmitted information is stored in the nonvolatile memory 10c as the status data 10c3.

The processor 10a executes a control program (not shown). When the processor 10a executes the control program, the processor 10a functions as a control unit 10a1. The control unit 10a1 has a function of causing a plurality of image processing units provided in the image processing apparatus 20 to be described later to execute the image processing. In the embodiment, the control information 10c1 including information for specifying the image processing apparatus 20 which is to execute the image processing is generated, and the control information 10c1 is transferred to the image processing apparatus 20. Thereafter, the image processing apparatuses 20 are selected sequentially without control by the control apparatus 10.

Therefore, the control unit 10a1 performs control to cause the plurality of image processing units provided in the image processing apparatus 20 to execute the image processing, and does not perform management for selecting the image processing apparatus 20 each time according to the progress of the image processing. That is, the control unit 10a1 generates the control information 10c1 and transfers the control information 10c1 and the image data 10c2 that is the processing target to the image processing apparatus 20 including a first image processing unit that is an initial image processing unit. By the processing, it can be said that the control unit 10a1 controls the image processing apparatuses 20 to be sequentially selected. After the information is transferred to the first image processing unit, the printing by the printing apparatus 30 is completed even when the control unit 10a1 does not perform control processing such as selection of the image processing apparatus 20. Therefore, a processing load required for the control unit 10a1 to distribute the image processing is fairly small.

The control information 10c1 includes the information for specifying the image processing apparatus 20 which is to execute the image processing. Alternatively, the image processing apparatus 20 which is to execute the image processing may be determined automatically by the control unit 10a1 or may be determined by the user. In the former case, for example, the number of reservations of processing for the image processing units provided in the plurality of image processing apparatuses 20 may be equally distributed. In the latter case, the image processing unit of each image processing apparatus 20 may be displayed on the display 10d, and the input unit 10e may receive a specification from the user. In each case, for each print job, it is determined in advance which image processing unit of which image processing apparatus 20 is to execute the image processing necessary for printing, and the determination is described in the control unit 10a1.

The control unit 10a1 in the embodiment can execute processing according to the status data. When the status data 10c3 is stored in the nonvolatile memory 10c, the control unit 10a1 can execute processing according to the status data 10c3. The processing according to the status data 10c3 may be various types of processing, such as displaying the status. Specifically, the control unit 10a1 refers to the status data 10c3 and displays the progress of the image processing indicated by the status data 10c3 on the display 10d. According to this configuration, the user can grasp the progress of the image processing related to the print job. The processing according to the status data 10c3 is not limited to display, and a warning according to the status may be issued, or progress management such as standby or restart of the image processing may be performed according to the status.

(1-3) Configuration of Image Processing Apparatus:

FIG. 4 is a block diagram showing a configuration of the image processing apparatus 20. The image processing apparatus 20 includes a processor 20a, a communication unit 20b, a nonvolatile memory 20c, a display 20d, and an input unit 20e. The processor 20a includes a CPU, a ROM, a RAM, and the like (not shown), and can execute various programs recorded in the nonvolatile memory 20c to control each unit of the image processing apparatus 20. The processor 20a can execute various types of arithmetic processing such as image processing.

The communication unit 20b includes a communication interface for communicating with an external device according to various communication protocols. The image processing apparatus 20 can communicate with the control apparatus 10 and the printing apparatus 30 via the communication unit 20b. The communication unit 20b may include an interface for communicating with various removable memories mounted on the image processing apparatus 20.

The display 20d is a display unit that displays any image. The input unit 20e is an apparatus through which the user performs an input operation, and includes, for example, a keyboard and a mouse. In the embodiment, it is assumed that the image processing apparatus 20 is a stationary terminal, and of course, the image processing apparatus 20 may be a terminal of another form. For example, the control apparatus 10 may be a tablet terminal or a smartphone terminal. When the image processing apparatus 20 is such a terminal, the input unit 20e may be implemented by a touch panel or the like. In any case, the user can input an intention of the user by operating the input unit 20e while visually recognizing an image or a character displayed on the display 20d. In the nonvolatile memory 20c, the control information 10c1 and processing target data 20c1, which is data on a process of processing by the image processing unit, are stored.

The processor 20a executes a print control program (not shown). When the processor 20a executes the print control program, the processor 20a functions as a communication control unit 20a1, a first image processing unit 20a2, and a second image processing unit 20a3. The processor 20a of the image processing apparatus 20 in FIG. 4 can execute the first image processing unit 20a2 and the second image processing unit 20a3. Alternatively, the processor 20a may execute one of these image processing units. When it is not necessary to distinguish between the first image processing unit 20a2 and the second image processing unit 20a3, the first image processing unit 20a2 and the second image processing unit 20a3 may each be simply referred to as an image processing unit.

In the embodiment, each of the communication control unit 20a1, the first image processing unit 20a2, and the second image processing unit 20a3 monitors a predetermined storage location. When the control information 10c1 is newly stored at the storage location, each unit performs processing according to the stored control information 10c1. Specifically, the information recorded in the nonvolatile memory 20c is recorded in a folder that is a logical storage location having a hierarchical structure.

In the embodiment, a print monitored folder as a folder monitored by the communication control unit 20a1, a first monitored folder as a folder monitored by the first image processing unit 20a2, and a second monitored folder as a folder monitored by the second image processing unit 20a3 are set in advance. That is, each folder is associated with a corresponding processing unit. Each folder can be specified by a path. That is, it is possible to specify each folder by a path that starts with identification information of the image processing apparatus 20 (an IP address in the embodiment) and describes folder names in order from an upper hierarchy up to a target folder. The image processing system 1 according to the embodiment may include a plurality of image processing apparatuses 20, and the identification information of the image processing apparatuses 20 in the path is different when the image processing apparatuses 20 are different from each other. Accordingly, targets monitored by the first image processing units 20a2 and the second image processing units 20a3 provided in the different image processing apparatuses 20 are different folders, and the folders are distinguished by different paths.

The communication control unit 20a1 has a function of controlling communication between the image processing apparatus 20 and the control apparatus 10 and communication between the image processing apparatus 20 and the printing apparatus 30. In the embodiment, when the control information 10c1 is stored in the print monitored folder, the communication control unit 20a1 starts processing based on the control information 10c1. In the embodiment, since the print data is stored in the print monitored folder together with the control information 10c1, the communication control unit 20a1 transmits the print data to the printing apparatus 30 and causes the printing apparatus 30 to execute printing. In the embodiment, the print monitored folder is associated with the printing apparatus 30. Accordingly, by storing the print data in the print monitored folder, the printing apparatus 30 associated with the print monitored folder is specified as a printing subject. Of course, a method for specifying the printing apparatus 30 may be various, for example, identification information of the printing apparatus 30 may be described in the control information 10c1.

Each of the first image processing unit 20a2 and the second image processing unit 20a3 has a function of executing a part of the image processing for printing in the printing apparatus 30. In the embodiment, the first image processing unit 20a2 executes an initial piece of image processing among a series of processing of converting the image data 10c2 into the print data processable by the printing apparatus 30. The second image processing unit 20a3 executes image processing which is to be executed following the image processing by the first image processing unit 20a2.

Output data after the processing by the second image processing unit 20a3 is the print data processable by the printing apparatus 30. When the first image processing unit 20a2 processes the image data and the second image processing unit 20a3 processes the processed data, the print data processable by the printing apparatus 30 is generated. The image processing apparatus 20 provided in the image processing system 1 transmits the print data to the printing apparatus 30 via the network, or transfers the print data to the printing apparatus 30 via a portable recording medium such as a universal serial bus (USB).

In the embodiment, the first image processing unit 20a2 is in charge of processing up to rasterization, for example, rendering processing including analysis based on a printing apparatus description language in the image data 10c2 and conversion-to-raster-data processing. The second image processing unit 20a3 is in charge of processing after the rasterization, for example, color conversion processing of the raster data based on an ICC profile, page layout determination processing on a print medium, and halftone processing. The image processing executed by the first image processing unit 20a2 is referred to as first image processing, and the image processing executed by the second image processing unit 20a3 is referred to as second image processing.

Although data input to and output by the first image processing unit 20a2 and data input to and output by the second image processing unit 20a3 are different, in the present specification, data that is a processing target of each image processing unit may be referred to as input data, and data generated by processing may be referred to as output data. The input data and the output data are the processing target data 20c1 shown in FIG. 4.

In the embodiment, when the control information 10c1 is stored in the first monitored folder, the first image processing unit 20a2 starts processing based on the control information 10c1. In the embodiment, in the first monitored folder, the image data that is the input data serving as the processing target is stored together with the control information 10c1. The first image processing unit 20a2 generates the raster data that is the output data based on the input data, and stores the output data in the second monitored folder indicated by the control information 10c1. Since the storage into the second monitored folder functions as a processing start request to the second image processing unit 20a3, it can be said that the first image processing unit 20a2 outputs the output data to the second image processing unit 20a3 that performs the following processing.

In the embodiment, when the control information 10c1 is stored in the second monitored folder, the second image processing unit 20a3 starts processing based on the control information 10c1. In the embodiment, in the second monitored folder, the raster data that is the input data serving as the processing target is stored together with the control information 10c1. The second image processing unit 20a3 generates the print data that is the output data based on the input data, and stores the output data in the print monitored folder indicated by the control information 10c1. The storage into the print monitored folder is a processing start request to the communication control unit 20a1.

FIG. 4 shows a configuration of one image processing apparatus 20, and the image processing system 1 includes a plurality of image processing apparatuses 20 as shown in FIG. 1. In the embodiment, the image data is converted into the print data by using any one of a plurality of the first image processing units 20a2 and the second image processing units 20a3 that are distributed in the plurality of image processing apparatuses 20. The first image processing unit 20a2 and the second image processing unit 20a3 that execute the image processing may be provided in different image processing apparatuses 20, and an image processing unit which is to perform the processing is defined by the control information 10c1. Accordingly, when the control information 10c1 is generated in the control apparatus 10 and the control information 10c1 is stored in the first monitored folder to start the image processing by the first image processing unit 20a2, the control apparatus 10 does not need to perform processing related to distribution of the image processing unit thereafter. Accordingly, in the control apparatus 10, it is not necessary to perform processing for determining a distribution destination of the image processing, processing for distributing data before and after the image processing, and the like, and thus a processing load is reduced as compared with a case where such processing is performed. Hereinafter, a configuration for implementing such reduction in the processing load will be described in detail.

(2) CONTROL INFORMATION

FIG. 5 shows an example of the control information 10c1. In the embodiment, the control information 10c1 includes a parameter used in the image processing, route information, and an input data storage location. In the embodiment, the parameter used in the image processing is a value indicating print setting. In FIG. 5, color, single-sided/double-sided, type of print medium, print size, print quality, and number of copies are shown as examples of print setting items. Since contents of the image processing may vary due to setting values of these items, the control information 10c1 includes the parameter. For example, when color setting is black and white, the raster data generated by the first image processing unit 20a2 is generated in grayscale. For example, the first image processing unit 20a2 specifies a resolution according to the print size and the print quality, and generates the raster data according to the resolution.

The route information is information indicating a route along which data transitions from the start of printing to the generation of the print data according to the image data. In the embodiment, the route information includes information specifying an image processing unit which is to perform a series of processing for printing by the printing apparatus among the plurality of image processing units. Specifically, the route information includes a path of a monitored folder monitored by the image processing unit which is to perform the processing. Since the monitored folder is associated with the image processing unit, specifying the monitored folder by the path is equivalent to specifying the image processing unit which is to perform the processing.

The storage location where the status data 10c3 is stored in the nonvolatile memory 10c of the control apparatus 10 in the embodiment is a specific folder determined in advance. Here, this folder is referred to as a status data storage folder. In the embodiment, each image processing unit generates the status data 10c3 indicating a progress in a process of processing, and stores the status data 10c3 in the status data storage folder. As a result, the status data 10c3 indicating the progress of the series of processing for printing is sequentially stored in the status data storage folder in the nonvolatile memory 10c of the control apparatus 10. Therefore, the control apparatus 10 can specify the progress of the image processing.

The route information of the control information 10c1 includes paths of the status data storage folder, the monitored folder of the image processing unit, and the monitored folder of the communication control unit 20a1. A description mode of the paths may be various, and in the embodiment, the path of the status data storage folder is the first one, and thereafter the route information is formed by describing the paths in order of progress of the image processing.

For example, in the example shown in FIG. 5, the path of the status data storage folder is described first (at the top) in the route information. That is, the path of the status data storage folder, which starts with an IP address of the control apparatus 10 and ends with a name of the status data storage folder, is disposed first in the route information.

Following the path of the status data storage folder, the path of the monitored folder monitored by the first image processing unit 20a2 that performs the first image processing is described. That is, the path of the first monitored folder, which starts with an IP address of the image processing apparatus 20 and ends with a name of the first monitored folder, is disposed. Thereafter, the path of the second monitored folder is disposed, and finally, the path of the print monitored folder is disposed, whereby the route information is formed.

The storage location of the input data is specified by a path of a folder where the input data serving as the processing target of the first image processing unit 20a2 or the second image processing unit 20a3 is stored. In the embodiment, the monitored folder associated with each image processing unit is the storage location of the input data. Accordingly, in the embodiment, the storage location of the control information 10c1 matches the storage location of the input data, and the input data is stored in the monitored folder together with the control information 10c1. Accordingly, the control information 10c1 may be considered to include the input data. The storage location of the input data may store other data necessary for the image processing, for example, an ICC profile.

In the example shown in FIG. 5, the storage location of the input data is the path of the first monitored folder. Accordingly, the control information 10c1 shown in FIG. 5 is information transferred to the first image processing unit 20a2, and when the control information 10c1 is transferred to the second image processing unit 20a3, the storage location of the input data is rewritten. That is, when the first image processing unit 20a2 performs the image processing based on the control information 10c1 shown in FIG. 5 and then outputs the output data to the second image processing unit 20a3 that performs the following processing, the storage location of the input data is rewritten to the path of the second monitored folder.

It can be said that the control information 10c1 as described above includes information indicating the input data serving as the processing target. Specifically, the image processing unit can acquire the input data serving as the processing target by referring to the storage location of the input data indicated by the control information 10c1. Accordingly, the storage location of the input data is information indicating the input data serving as the processing target. In the example shown in FIG. 5, the storage location of the input data matches the storage location of the control information 10c1, that is, the monitored folder. Alternatively, the storage locations may be different locations.

Further, it can be said that the control information 10c1 includes information for identifying the image processing unit which is to perform the following processing on the processed output data. Specifically, in the route information, the paths of the folders monitored by the image processing units are described according to the order of image processing. Accordingly, the image processing unit that performs a certain piece of image processing can specify that the monitored folder described following the monitored folder associated with the image processing unit is a folder monitored by the image processing unit which is to perform the following image processing. For example, in the example shown in FIG. 5, when the first image processing unit 20a2 performs the image processing, it can be specified that the second image processing unit 20a3 associated with the second monitored folder described following the first monitored folder monitored by the first image processing unit 20a2 is to perform the following processing.

(3) IMAGE PROCESSING

Next, the image processing executed by the image processing unit based on the control information 10c1 described above will be described. The control information 10c1 is generated in the control apparatus 10. In the control apparatus 10, an application program (not shown) can be executed, and the user can instruct printing of any image data by using the display 10d and the input unit 10e as a user interface. At this time, the user operates the input unit 10e to input the print setting.

When printing is instructed, the control information 10c1 is generated by the function of the control unit 10a1. The control information 10c1 may be automatically generated by the control unit 10a1 or may be generated by the user. Here, the latter case is assumed. In this case, the user operates the input unit 10e to specify, from choices of the image processing units displayed on the display 10d, the image processing apparatus 20 and the image processing unit, which are to execute the image processing, and the printing apparatus 30. Then, the control unit 10a1 performs image processing by the specified image processing unit and generates the control information 10c1 for printing by the specified printing apparatus 30.

When the control information 10c1 is generated, the control unit 10a1 stores the control information 10c1 and the input data in the monitored folder of the first image processing unit 20a2 indicated in the control information 10c1. Thereafter, the image processing unit performs the image processing in an order indicated in the control information 10c1.

Figure 6:
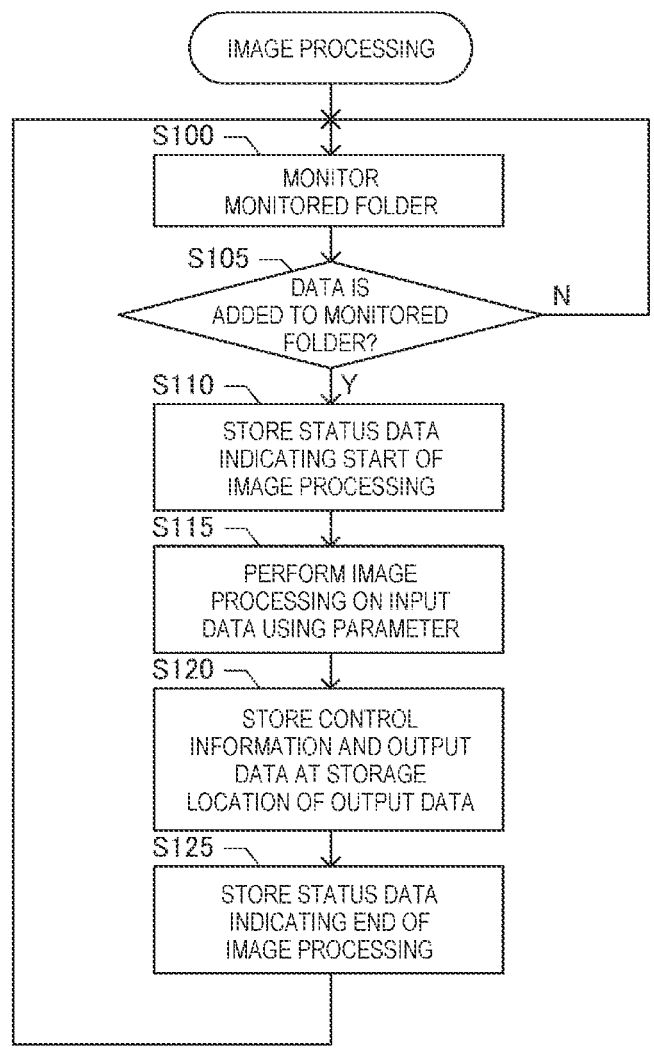
FIG. 6 is a flowchart of image processing.

FIG. 6 is a flowchart of the image processing. The image processing is processing executed by the first image processing unit 20a2 and the second image processing unit 20a3. In this processing, differences may occur in the parameter, the input data, and the output data, but a flow of the processing is common to the image processing units, and thus the flow of the processing will be described herein without distinguishing the differences between the image processing units.

The first image processing unit 20a2 and the second image processing unit 20a3 installed in the image processing apparatus 20 execute the image processing shown in FIG. 6. In the image processing, the image processing unit monitors the monitored folder (step S100) and determines whether data is added to the monitored folder (step S105). That is, the image processing unit periodically refers to the monitored folder associated in advance with the image processing unit and determines whether new data is added. When it is not determined that new data is added, the image processing unit executes step S100 and subsequent steps.

In step S105, when it is determined that new data is added to the monitored folder, the control information 10c1 and the input data are stored as a set in the monitored folder. The image processing unit stores the status data indicating the start of image processing (step S110). That is, the image processing unit refers to the control information 10c1 to specify the path of the status data storage folder, outputs the status data 10c3 indicating the start of image processing to the control apparatus 10, and stores the status data 10c3 in the status data storage folder.

Next, the image processing unit performs the image processing on the input data using the parameter (step S115). That is, the image processing unit refers to the control information 10c1, acquires the input data stored at the storage location of the input data, and specifies the parameter of the image processing based on the control information 10c1. Then, the image processing unit performs the image processing, in which the parameter is applied, on the input data, and generates the output data.

Next, the image processing unit stores the control information 10c1 and the output data at a storage location of the output data (step S120). That is, the image processing unit refers to the control information 10c1 to specify a monitored folder monitored by the image processing unit of the following processing, and stores the control information 10c1 and the output data in the monitored folder.

Next, the image processing unit stores the status data indicating the end of the image processing (step S125). That is, the image processing unit refers to the control information 10c1 to specify the path of the status data storage folder, outputs the status data 10c3 indicating the end of image processing to the control apparatus 10, and stores the status data 10c3 in the status data storage folder. According to the above configuration, the image processing can be sequentially executed in the order indicated in the control information 10c1.

(4) PRINT DATA PROCESSING

Figure 7:
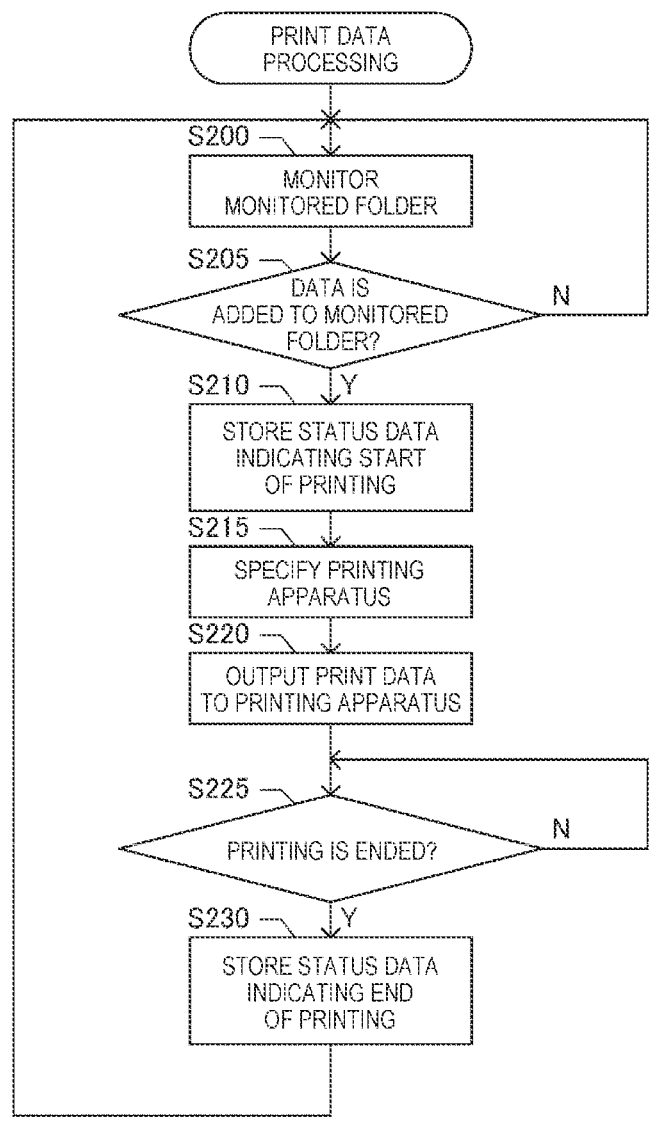
FIG. 7 is a flowchart of print data processing.

Next, print data processing executed by the communication control unit 20a1 based on the control information 10c1 will be described. FIG. 7 is a flowchart of the print data processing. The print data processing is processing executed by the communication control unit 20a1. The communication control unit 20a1 installed for each image processing apparatus 20 executes the print data processing shown in FIG. 7. In the print data processing, the communication control unit 20a1 monitors the print monitored folder (step S200) and determines whether data is added to the print monitored folder (step S205). That is, the communication control unit 20a1 periodically refers to the print monitored folder associated in advance with the communication control unit 20a1 and determines whether new data is added. When it is not determined that new data is added to the print monitored folder, the communication control unit 20a1 executes step S200 and subsequent steps.

In step S205, when it is determined that new data is added to the print monitored folder, the control information 10c1 and the input data are stored as a set in the print monitored folder. The communication control unit 20a1 stores the status data indicating the start of printing (step S210). More specifically, the communication control unit 20a1 refers to the control information 10c1 to specify the path of the status data storage folder, outputs the status data 10c3 indicating the start of printing to the control apparatus 10, and stores the status data 10c3 in the status data storage folder.

Next, the communication control unit 20a1 specifies the printing apparatus (step S215). That is, the communication control unit 20a1 refers to the control information 10c1 to specify the print monitored folder, and specifies the printing apparatus corresponding to the print monitored folder. Next, the communication control unit 20a1 outputs the print data to the printing apparatus 30 (step S220). That is, the output data stored in the print monitored folder is the print data to be output to the printing apparatus 30 specified in step S215. Therefore, the communication control unit 20a1 outputs the print data to the printing apparatus 30. As a result, the printing apparatus 30 that is an output destination executes printing based on the print data.

When the printing is ended in the printing apparatus 30, the printing apparatus 30 notifies the communication control unit 20a1, which is an output source of the print data, of the end of printing. The communication control unit 20a1 determines whether the printing is ended based on the notification (step S225), and repeats the determination of step S225 until it is determined that the printing is ended.

When it is determined in step S225 that the printing is ended, the communication control unit 20a1 stores the status data indicating the end of printing (step S230). More specifically, the communication control unit 20a1 refers to the control information 10c1 to specify the path of the status data storage folder, outputs the status data 10c3 indicating the end of printing to the control apparatus 10, and stores the status data 10c3 in the status data storage folder. According to the above configuration, it is possible to execute printing based on the print data generated by performing the image processing according to the order indicated in the control information 10c1.

(5) IMAGE PROCESSING EXAMPLE

Figure 8:
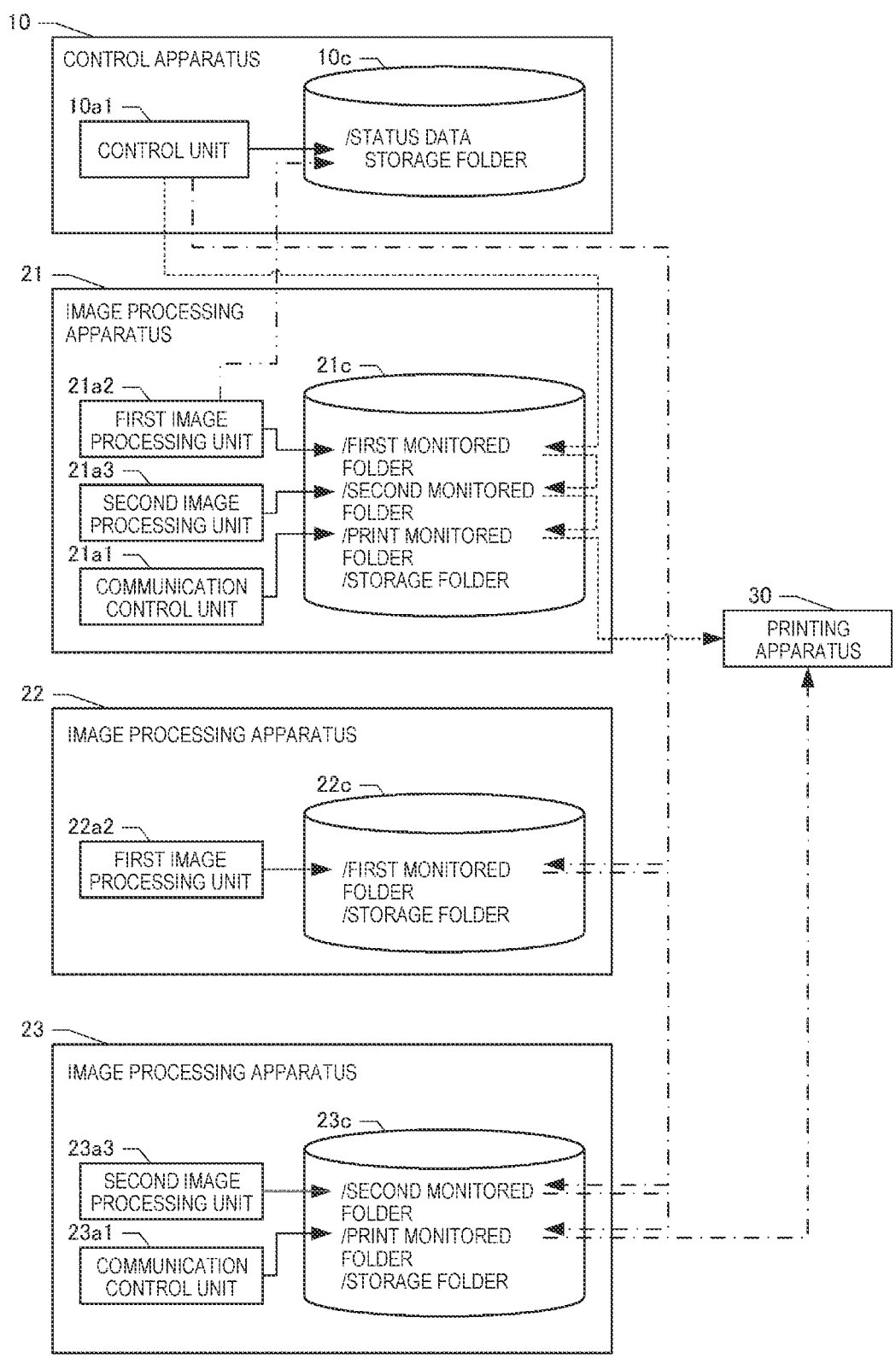
FIG. 8 shows an example of the image processing.

Next, a flow of the image processing according to the above-described configuration will be described as an example. FIG. 8 shows an image processing example of the image processing system 1. FIG. 8 shows an example in which there is one control apparatus 10, one printing apparatus 30, and three image processing apparatuses 20. The image processing apparatuses 20 are denoted as image processing apparatuses 21, 22, and 23 to distinguish the three apparatuses from each other. In FIG. 8, a part of configurations of the control apparatus 10 and the image processing apparatuses 21, 22, and 23 are extracted and shown.

In the example shown in FIG. 8, the image processing apparatus 21 includes a first image processing unit 21a2 and a second image processing unit 21a3. The image processing apparatus 22 includes a first image processing unit 22a2 and does not include any second image processing unit. The image processing apparatus 23 includes a second image processing unit 23a3 and does not include any first image processing unit. The image processing apparatuses 21 and 23 include a communication control unit 21a1 and a communication control unit 23a1, respectively. Since the image processing apparatus 22 does not include any second image processing unit that generates the print data to be output to the printing apparatus 30, no communication control unit is shown, but of course the image processing apparatus 22 may include a communication control unit to control communication between the control apparatus 10 and the image processing apparatus 22.

In the example shown in FIG. 8, the control apparatus 10 includes the nonvolatile memory 10c, the image processing apparatus 21 includes a nonvolatile memory 21c, the image processing apparatus 22 includes a nonvolatile memory 22c, and the image processing apparatus 23 includes a nonvolatile memory 23c. Data stored in each nonvolatile memory is stored in association with a folder prepared in advance. In FIG. 8, folders set in the nonvolatile memories 10c, 21c, 22c, and 23c are shown, and folders that are monitoring targets of the respective units are shown by solid arrows extending from the control unit 10a1, the image processing units, and the communication control units to the folders. FIG. 8 shows an example in which the output data subjected to image processing by the image processing apparatuses 21, 22, and 23 can be stored without being transferred to the following processing, and folders for storage are shown as storage folders.

In the above configuration, the image processing for converting the image data into the print data is executed by any one of the image processing units provided in the image processing apparatuses 21, 22, and 23. That is, the image data is processed by any of the first image processing units 21a2 and 22a2, and the output data of the processing is processed by any of the second image processing units 21a3 and 23a3. In this way, since the image processing unit that performs the processing can be selected as desired from the plurality of image processing units, a processing load of the image processing can be dispersed.

The processing can be distributed by describing a folder path for the control information 10c1. For example, it is assumed that the image processing is performed by the first image processing unit 21a2 and the second image processing unit 21a3 of the image processing apparatus 21 and printing is performed by the printing apparatus 30 as indicated by dashed arrows. In this case, the control information 10c1 describes the path of the first monitored folder, the path of the second monitored folder, and the path of the print monitored folder set in the image processing apparatus 21.

When the control information 10c1 is stored in the first monitored folder of the image processing apparatus 21 together with the image data, the first image processing unit 21a2 performs image processing using the image data as the input data, and stores the control information 10c1 and the output data in the second monitored folder of the image processing apparatus 21. When the control information 10c1 and the output data are stored in the second monitored folder of the image processing apparatus 21, the second image processing unit 21a3 performs image processing using the stored data as the input data, and stores the control information 10c1 and the output data in the print monitored folder of the image processing apparatus 21. When the control information 10c1 and the output data are stored in the print monitored folder of the image processing apparatus 21, the communication control unit 21a1 outputs the print data, which is the stored data, to the printing apparatus 30. As a result, printing is executed in the printing apparatus 30. A two-dot dashed arrow indicates a flow of the status data 10c3. FIG. 8 shows the flow when the status data 10c3 is transmitted from the first image processing unit 21a2 to the status data storage folder in the control apparatus 10 as an example. Of course, the status data 10c3 indicating a progress in other image processing unit is sequentially stored in the status data storage folder.

Meanwhile, as indicated by one-dot dashed arrows, it is assumed that the image processing is performed by the first image processing unit 22a2 of the image processing apparatus 22 and the second image processing unit 23a3 of the image processing apparatus 23, and printing is performed by the printing apparatus 30. In this case, the control information 10c1 describes the path of the first monitored folder set in the image processing apparatus 22, the path of the second monitored folder and the path of the print monitored folder set in the image processing apparatus 23.

When the control information 10c1 is stored in the first monitored folder of the image processing apparatus 22 together with the image data, the first image processing unit 22a2 performs the image processing using the image data as the input data, and stores the control information 10c1 and the output data in the second monitored folder of the image processing apparatus 23. When the control information 10c1 and the output data are stored in the second monitored folder of the image processing apparatus 23, the second image processing unit 23a3 performs image processing using the stored data as the input data, and stores the control information 10c1 and the output data in the print monitored folder of the image processing apparatus 23. When the control information 10c1 and the output data are stored in the print monitored folder of the image processing apparatus 23, the communication control unit 23a1 outputs the print data, which is the stored data, to the printing apparatus 30. As a result, printing is executed in the printing apparatus 30.

As described above, in the embodiment, the image processing unit that is a distribution destination is described in the control information 10c1 in advance, and the image processing proceeds according to the control information 10c1. Therefore, the control apparatus 10 does not need to perform management such as determining the image processing apparatus 20 that is an execution subject after the image processing is started, and a processing load is reduced as compared with a case where the control apparatus 10 performs the management. Further, in the embodiment, it is determined in advance that the processing by the second image processing unit is performed after the image processing by the first image processing unit. Therefore, the image processing for converting the image data into the print data is subdivided, and a degree of freedom in selection of the distribution destination is improved as compared with a case where the image processing is not subdivided. The distribution destination of the image processing only needs to be selected one by one from the first image processing units and the second image processing units, and thus the distribution destination can be easily selected.

Further, in the embodiment, the image processing unit monitors the monitored folder, and the processing is started in response to update of data in the monitored folder. Accordingly, simply by processing of storing data in a predetermined folder, the input data and the output data necessary for the series of image processing can be transferred. Therefore, the distribution destination of the series of image processing can be defined by simple processing of describing the path in the control information.

Further, in the embodiment, by monitoring the print monitored folder, the communication control unit detects that the print data is generated after the image processing and outputs the print data to the printing apparatus. Accordingly, data related to printing can be transferred simply by processing of storing data in the predetermined folder. Therefore, the printing apparatus that is the printing subject can be defined by simple processing of describing the path in the control information.

Further, in the embodiment, the status data indicating the progress of the image processing is stored at the predetermined storage location. Accordingly, by referring to the status data at the storage location, it is possible to easily specify the progress of the image processing that is distributively processed. Further, in the embodiment, before starting the image processing, the path of the folder monitored by each image processing unit performing the series of processing is described in the control information. Therefore, the image processing unit can be easily specified. A processing load on the control apparatus can also be reduced.

Further, in the embodiment, since the set of the control information and the input data is stored in a common folder, it is not necessary to extract data used for the image processing from a plurality of storage destinations, and thus processing by the image processing unit can be simplified. Further, in the embodiment, since the control information includes the parameter used in the image processing, it is not necessary to extract the parameter used in the image processing from a storage location different from that of the control information, and thus the processing by the image processing unit can be simplified.

(6) ASSIGNMENT OF IMAGE PROCESSING

Figure 9:
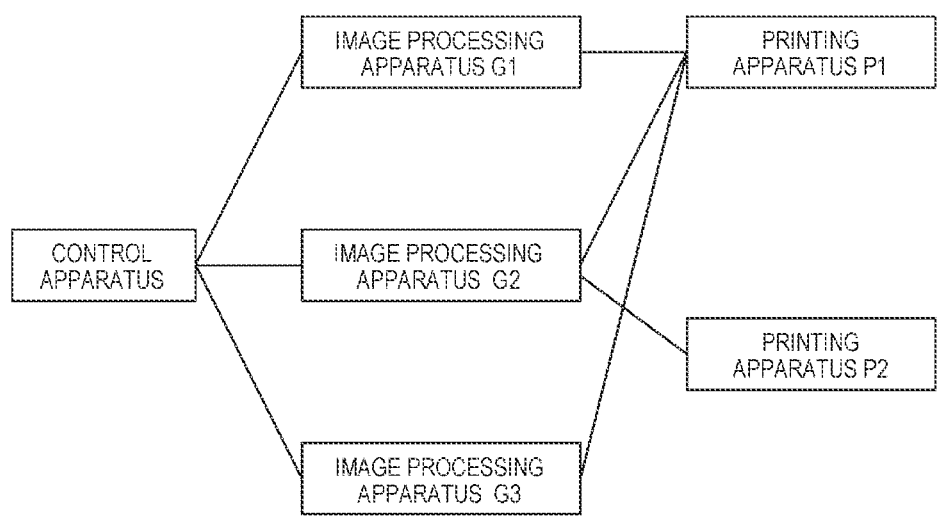
FIG. 9 shows a configuration example of the image processing system.

The print data cannot be transferred from all the image processing apparatuses 20 provided in the image processing system 1 to all the printing apparatuses 30. The second image processing, which is image processing for conversion into the print data, is limited to an image processing apparatus connected to the printing apparatus. For example, as shown in FIG. 9, it is assumed that image processing apparatuses G1, G2, and G3 are connected to a printing apparatus P1 via a network, and only the image processing apparatus G2 is connected to a printing apparatus P2 by a USB. It is assumed that a model name of the printing apparatus P1 is A and a model name of the printing apparatus P2 is B. In this case, when the printing apparatus P1 is set as the printing apparatus, any of the image processing apparatuses G1, G2, and G3 can be in charge of the second image processing. On the other hand, when the printing apparatus P2 is set as the printing apparatus, only the image processing apparatus G2 can be in charge of the second image processing. The image processing system 1 in the embodiment performs processing for assigning such image processing to the image processing apparatus 20.

Figure 10:
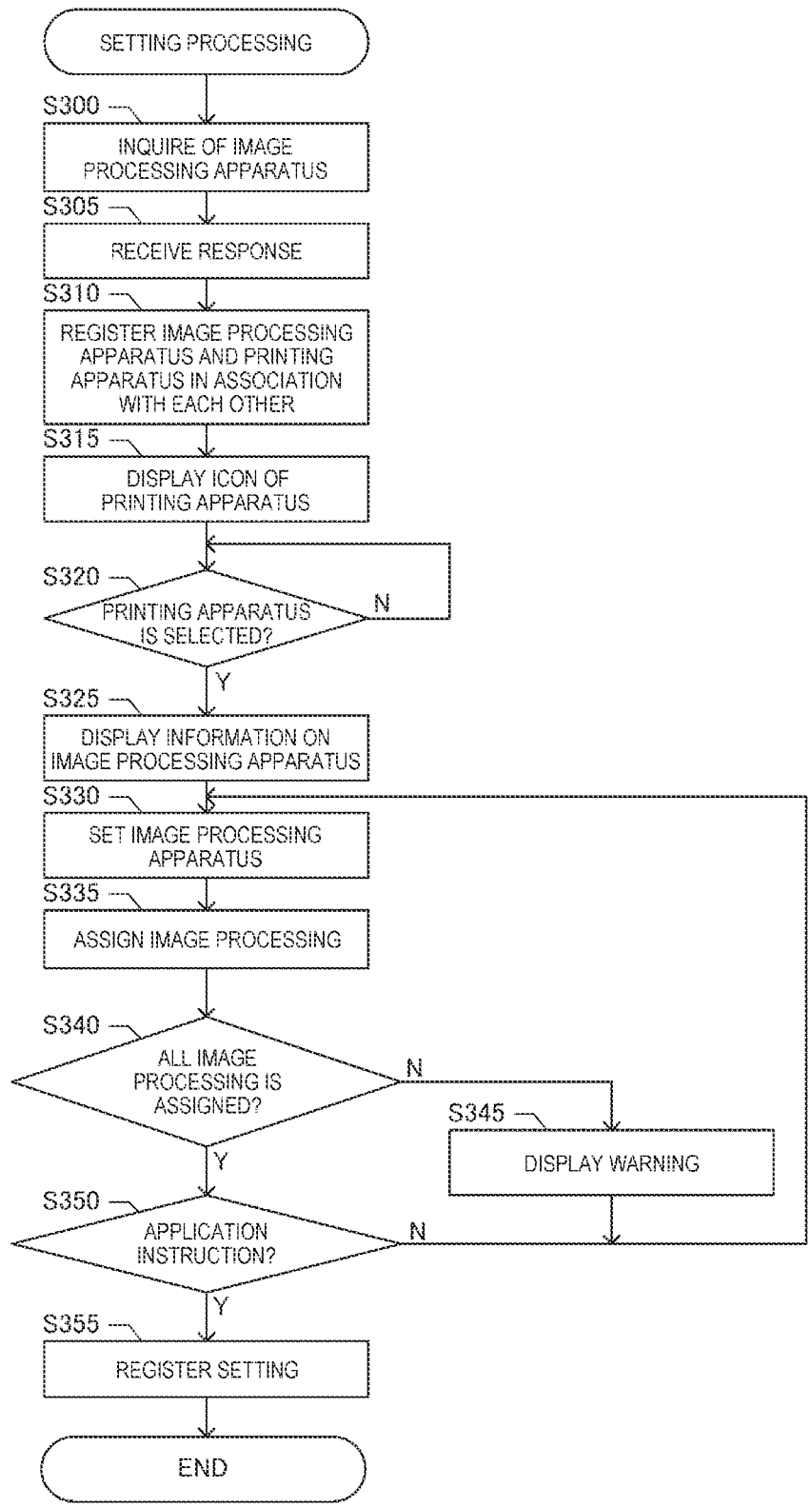
FIG. 10 is a flowchart showing setting processing of the image processing.

FIG. 10 is a flowchart showing setting processing of the image processing performed by the control apparatus 10. This processing is started in response to a user operation. First, the control unit 10a1 of the control apparatus 10 inquires of all the image processing apparatuses 20 provided in the image processing system 1 about which printing apparatus 30 is available for an instruction to print the print data (step S300). In response to this, each image processing apparatus 20 returns, as a response, information indicating the printing apparatus 30 connected via the network, for example. It is assumed that the image processing apparatus 20 can transfer the print data to the printing apparatus 30 via a portable recording medium. In this case, for example, since driver software of the printing apparatus 30 is installed, the image processing apparatus 20 recognizes the printing apparatus 30 as the printing apparatus 30 to which the print data can be transferred, and returns information indicating the printing apparatus 30 as a response.

The control unit 10a1 receives a response from each image processing apparatus 20 (step S305). The response indicates the printing apparatus available for instruction to print the print data. Next, the control unit 10a1 registers, in the nonvolatile memory 10c, information indicating the image processing apparatus 20 that is a transmission source of the response and information indicating the printing apparatus 30 indicated in the response in association with each other (step S310).

Figure 11:
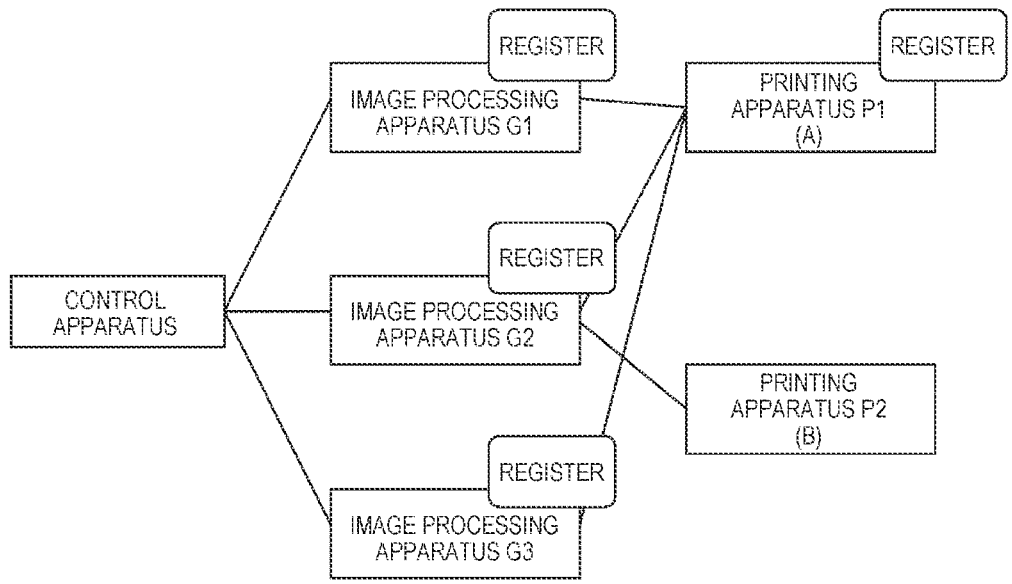
FIG. 11 is a schematic diagram of the setting processing.
Figure 12:
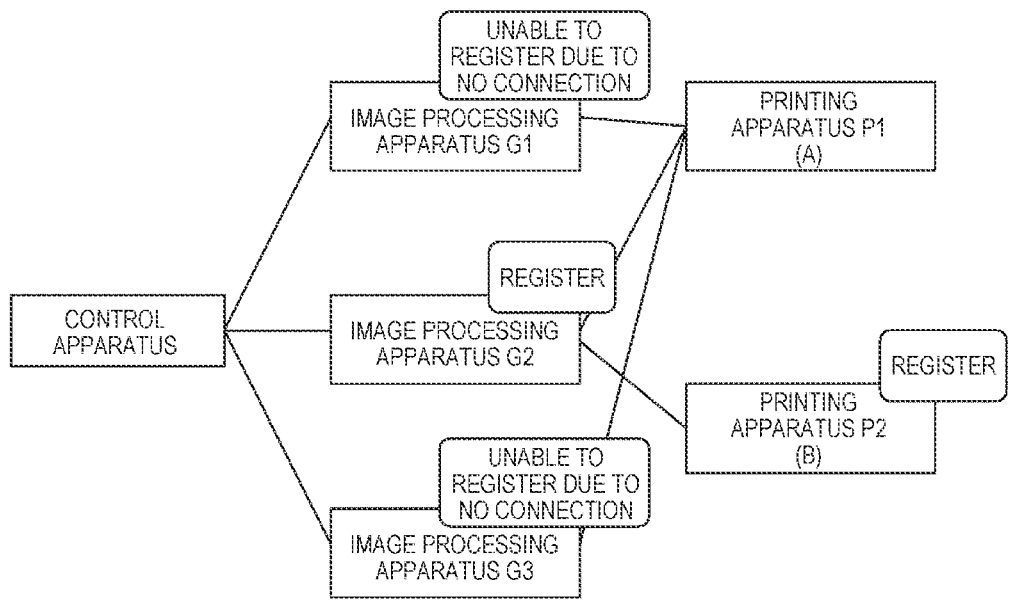
FIG. 12 is a schematic diagram of the setting processing.

For example, as shown in FIG. 11, the printing apparatus P1 is connected to the image processing apparatuses G1, G2, and G3. Therefore, the three image processing apparatuses G1, G2, and G3 and the printing apparatus P1 are registered in association with each other. Meanwhile, as shown in FIG. 12, the printing apparatus P2 is connected only to the image processing apparatus G2, and is not connected to the image processing apparatuses G1 and G3. Therefore, the printing apparatus P2 is registered in association with only the image processing apparatus G2. In this way, in the embodiment, even the printing apparatus 30 that is not directly connected to the control apparatus 10 can be registered as a printing apparatus controllable by the control apparatus 10.

The description returns to FIG. 10. After step S310, the control unit 10a1 displays, on the display 10d, icons indicating all the printing apparatuses 30 provided in the image processing system 1 (step S315). Specifically, the control unit 10a1 displays a setting screen. The setting screen is a screen for registering the image processing apparatus and the image processing unit in charge of the distributed processing including the first image processing and the second image processing. The setting screen will be described later. Next, the control unit 10a1 stands by until one icon among the icons indicating the printing apparatuses 30 displayed on the display 10d, that is, one printing apparatus 30 is selected as a setting target by a user operation (N in step S320). When one printing apparatus 30 is selected (Y in step S320), the control unit 10a1 advances the processing to step S325. In step S325, the control unit 10a1 displays, on the display 10d, information indicating the image processing apparatus 20 registered in association with the printing apparatus 30 selected in step S320.

Figure 13:
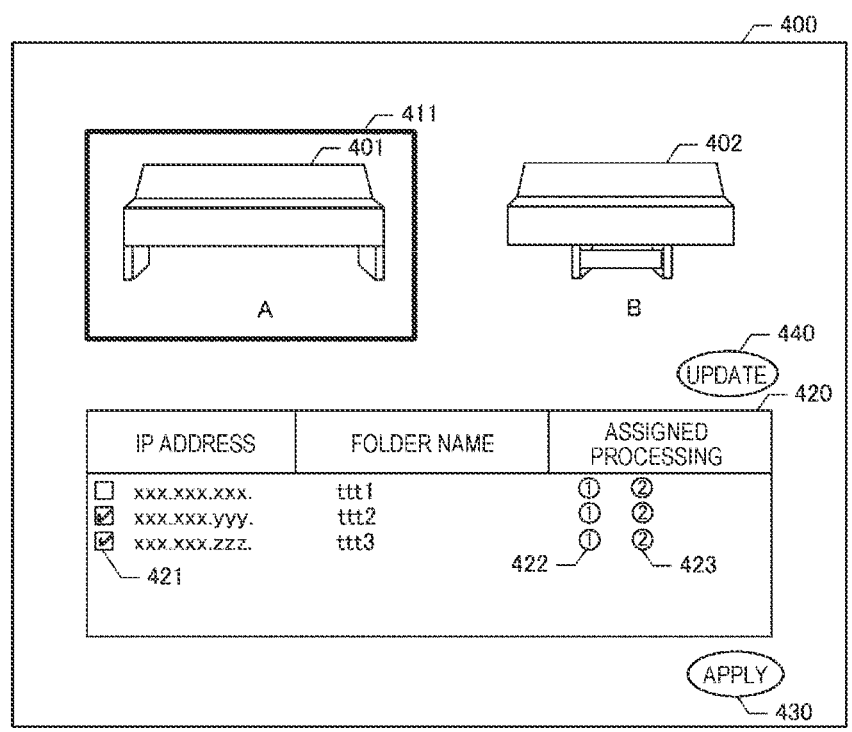
FIG. 13 shows a display example of a setting screen.

FIG. 13 shows a display example of a setting screen 400 displayed on the display 10d. On an upper side on the setting screen 400, icons 401 and 402 corresponding to the two printing apparatuses P1 and P2 are displayed. The icons indicate appearance of the printing apparatuses P1 and P2. Accordingly, the user can easily distinguish the printing apparatuses P1 and P2 corresponding to the icons based on shapes of the icons. Then, for example, when the printing apparatus P1 having the model name A among the two printing apparatuses 30 is selected as the setting target according to the user operation, the printing apparatus P1 is highlighted. As a specific mode of the highlighting, as shown in FIG. 13, a frame 411 is displayed around the icon 401 of the printing apparatus P1. A mode of the highlighting is not limited to that in the embodiment. As another example, a background color of the printing apparatus P1 may be changed to a different color as the highlighting. In another example, the specified printing apparatus P1 may be relatively highlighted by graying out the printing apparatus that is not specified.

Further, an image processing apparatus display field 420 is provided on a lower side on the setting screen 400. When the icon of the printing apparatus is selected, information on the image processing apparatus 20 that can instruct the selected printing apparatus to perform printing is displayed in the image processing apparatus display field 420. The information on the image processing apparatus 20 includes a check box 421, an IP address, a folder name, and assigned processing for selecting the image processing apparatus 20.

The check box 421 is an input field for inputting a check when the user intends to specify the image processing apparatus 20 to be in charge of the distributed processing. The IP address is information for identifying the image processing apparatus 20. The folder name is information for identifying a folder prepared in the nonvolatile memory 20c provided in the image processing apparatus. The assigned processing is image processing assigned to the image processing apparatus 20, and an icon 422 of "1" shown in the drawing indicates the first image processing up to the rendering processing. An icon 423 of "2" indicates the second image processing including the halftone processing. The user can switch between selection and non-selection of the first image processing and the second image processing by selecting the icons 422 and 423 of "1" and "2", respectively. The icons 422 and 423 of "1" and "2" are both displayed in a selected state in an initial state, and are switched to a non-selected state, that is, grayed out according to a user operation.

As shown in FIG. 13, when the printing apparatus P1 is selected, the image processing apparatuses 20 registered in association with the printing apparatus P1, that is, the image processing apparatuses G1, G2, and G3 are displayed in the image processing apparatus display field 420. By checking the check box 421, the user can select the image processing apparatus 20 to be set as a candidate in charge of the distributed processing in association with the selected printing apparatus 30 from the image processing apparatuses 20 displayed in the image processing apparatus display field 420. For example, it is assumed that, even though the image processing apparatuses G1, G2, and G3 are all compatible with printing by the printing apparatus P1 from the viewpoint of a network connection state, it is desired to exclude the image processing apparatus G1 from subjects of the distributed processing since the image processing apparatus G1 is lower in performance than the other image processing apparatuses G2 and G3. In such a case, the user can exclude the image processing apparatus G1 from the candidate in charge by unchecking the image processing apparatus G1.

By selecting the icons 422 and 423 of "1" and "2" displayed as the assigned processing, the image processing can be assigned to the image processing apparatuses 20. For example, it is assumed that the image processing apparatus G2 performs the first image processing and the image processing apparatus G3 performs the second image processing. In this case, the user maintains the icon 422 of "1" corresponding to the image processing apparatus G2 in a selected state and selects the icon 423 of "2" corresponding to the image processing apparatus G3 to change the icon 423 into a non-selected state. This operation is an example of an operation of selecting the image processing unit.

The description returns to FIG. 10. When the check box 421 is checked by the user, the control unit 10a1 sets the image processing apparatus 20 for which the check is input as the candidate in charge of the distributed processing according to the user operation (step S330). Next, the user switches between selection and non-selection of the icons 422 and 423 of "1" and "2" of the assigned processing. In response to the user operation, the control unit 10a1 assigns the first image processing and the second image processing constituting the distributed processing to the image processing units of the image processing apparatuses (step S335). Accordingly, an execution order of the image processing units in charge of processing for performing the image processing for printing is determined. Information indicating the execution order and the printing apparatus is referred to as a print route. That is, the print route is information indicating the first image processing unit in charge of the first image processing, the second image processing unit in charge of the second image processing, and the printing apparatus 30 that performs printing using the image data after such image processing, that is, the print data.

The first image processing may be assigned to one first image processing unit 20a2 or may be assigned to a plurality of first image processing units 20a2 provided in a plurality of image processing apparatuses 20. In this case, one appropriate first image processing unit 20a2 is selected according to an operation state of each first image processing unit 20a2 when actual image processing is performed, and the selected first image processing unit 20a2 is in charge of the first image processing. Similarly, the second image processing may be assigned to one second image processing unit 20a3, or may be assigned to a plurality of second image processing units 20a3 provided in a plurality of image processing apparatuses 20.

Figure 14:
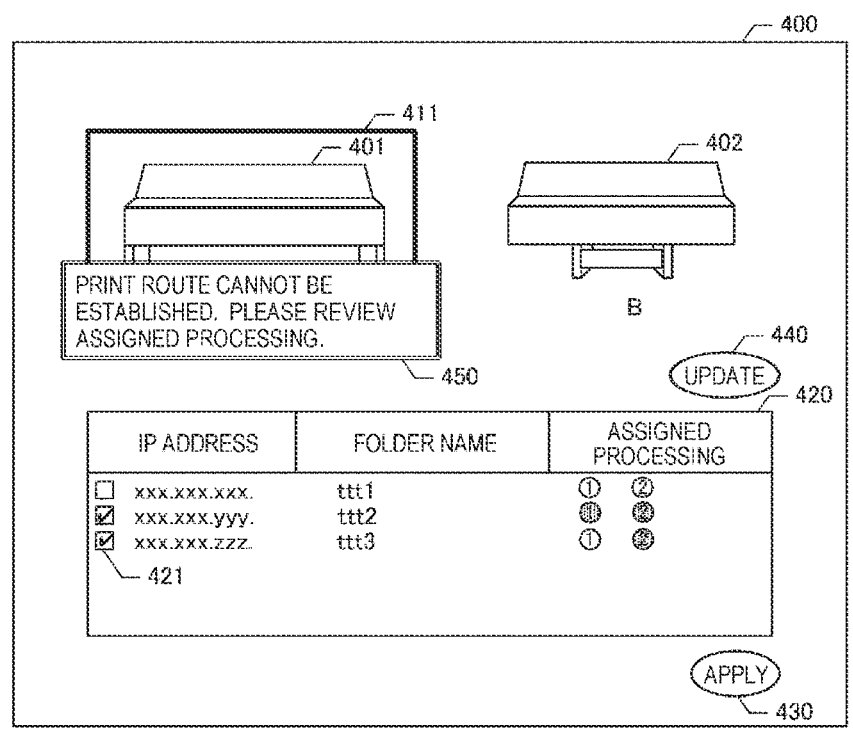
FIG. 14 shows a display example of a warning.

When the image processing is assigned in step S335, the control unit 10a1 checks whether all image processing constituting the distributed processing is assigned to the selected image processing apparatus (step S340). For example, as shown in FIG. 14, it is assumed that two image processing apparatuses are selected from the bottom in the image processing apparatus display field 420, and only the first image processing is assigned to both of the two image processing apparatuses. In this case, the second image processing unit 20a3 in charge of the second image processing is not selected, and the distributed processing cannot be completed. Therefore, in step S340, it is determined that there is unassigned image processing. In this way, when at least one of a plurality of pieces of image processing constituting the distributed processing is not assigned, it is determined in step S340 that there is unassigned image processing.

When there is unassigned image processing (N in step S340), the control unit 10a1 displays a warning 450 as shown in FIG. 14 (step S345). The warning 450 shows contents indicating that the print route for performing all image processing for printing is not established and recommending reassignment of the image processing, such as "Print route cannot be established. Please review assigned processing." In this way, by displaying the warning 450, it is possible to prompt the user to reassign the image processing and assign all of the plurality of pieces of image processing constituting the distributed processing. The display 10d is an example of an output unit. The warning is not limited to being displayed onto the display as long as the output unit outputs the warning. As another example, a speaker may output voice or warning sound indicating the warning.

In step S340, when all image processing constituting the distributed processing is assigned (Y in step S340), the control unit 10a1 advances the processing to step S350. In step S350, the control unit 10a1 checks whether an application instruction is received. When the user selects an apply button 430 displayed on the setting screen 400, the control unit 10a1 receives the application instruction.

When no application instruction is received (N in step S350), the control unit 10a1 advances the processing to S330. When the application instruction is received (Y in step S350), the control unit 10a1 advances the processing to S355. Then, in step S355, the control unit 10a1 registers setting contents on the setting screen 400. For example, it is assumed that the first image processing unit of the image processing apparatus G2 and the first image processing unit of the image processing apparatus G3 are assigned to be in charge of the first image processing for the printing apparatus P1, and the second image processing unit of the image processing apparatus G2 is assigned to be in charge of the second image processing for the printing apparatus P1. In this case, the image processing units of these image processing apparatuses are registered as the candidate in charge of the distributed processing in association with the printing apparatus.

As described above, each image processing unit of the image processing apparatus is associated with the printing apparatus by the setting processing. When a print instruction is input, the control apparatus 10 selects the first image processing unit and the second image processing unit respectively in charge of the first image processing and the second image processing from the image processing units set as the candidate in charge of the distributed processing, and causes the image processing units to perform image processing. Accordingly, the distributed processing is implemented.

When an update button 440 is selected on the setting screen 400, the control unit 10a1 checks a connection state between the printing apparatus 30 and the image processing apparatus 20 again and updates display contents. For example, it is assumed that an image processing apparatus 20 is newly added to the image processing system 1 and is connected in a manner of enabling printing by the printing apparatus P1. In this case, the newly added image processing apparatus 20 is registered in the nonvolatile memory 10c in association with the printing apparatus P1. When the printing apparatus P1 is selected, information on the newly added image processing apparatus 20 is displayed in the image processing apparatus display field 420.

When the new image processing apparatus 20 is added, the control unit 10a1 of the control apparatus 10 searches for an IP address reachable from the control apparatus 10 and checks whether transmission and reception are possible. For the search, a method of waiting for a response by broadcast by UDP may be used, or a method of specifying an IP address and trying to connect by TCP may be used.

(7) PRINT ROUTE DETERMINATION PROCESSING

In the control apparatus 10, when the user specifies the printing apparatus 30 and inputs the print instruction, the control apparatus 10 executes print route determination processing. In the print route determination processing, a print route including the first image processing unit 20a2 and the second image processing unit 20a3 respectively in charge of the first image processing and the second image processing for printing according to the print instruction is automatically determined.

The control apparatus 10 in the embodiment determines the print route based on the number of assignments, which is a unit number of pieces of image processing assigned to each image processing unit. Here, the number of assignments is the number of pieces of image processing assigned to one image processing unit. For example, when one piece of first image processing is assigned to one first image processing unit 20a2, the number of assignments is 1. When first image processing according to a first print instruction and first image processing according to a second print instruction are assigned to one first image processing unit 20a2, the number of assignments is 2. On the other hand, when no print instruction is input or the like, no first image processing is assigned to the first image processing unit 20a2, and the number of assignments is 0. The number of assignments is stored in the nonvolatile memory 20c of each image processing apparatus 20.

Figure 15:
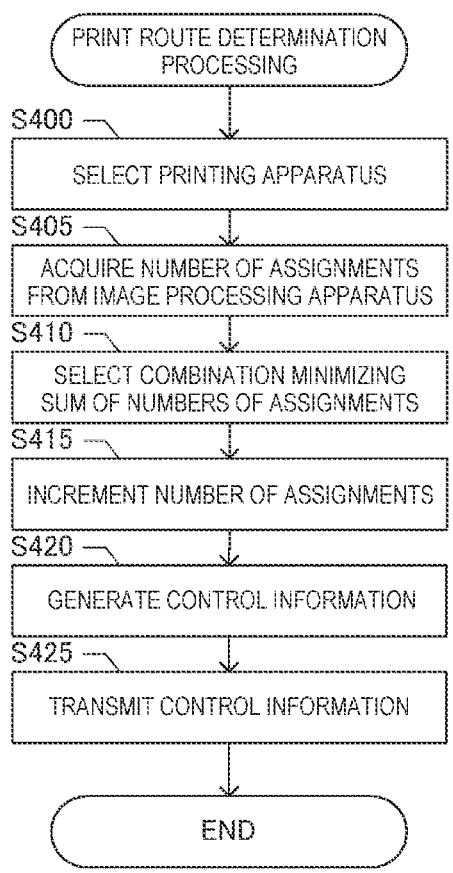
FIG. 15 is a flowchart showing print route determination processing.

FIG. 15 is a flowchart showing the print route determination processing. The print route determination processing is processing executed by the control apparatus 10. The user selects an icon of the printing apparatus 30 intended to perform printing, for example, by selecting the icon of the printing apparatus 30 displayed on the display 10d. In response to this, the control unit 10a1 of the control apparatus 10 determines the image processing unit in charge of the image processing. That is, when the printing apparatus is specified, the control unit 10a1 determines the image processing unit in charge of the image processing as the distributed processing. In the print route determination processing, when the icon of the printing apparatus 30 is selected, the control unit 10a1 of the control apparatus 10 selects the printing apparatus 30 corresponding to the icon selected by the user operation (step S400).

Next, the control unit 10a1 selects the first image processing unit in charge of the first image processing and the second image processing unit in charge of the second image processing from the image processing units set in the setting processing described with reference to FIG. 10 for the printing apparatus 30 selected in step S400, thereby determining the print route. Specifically, the control unit 10a1 first acquires the number of assignments of each image processing unit from each image processing apparatus 20 (step S405).

Next, the control unit 10a1 selects a combination of the first image processing unit 20a2 and the second image processing unit 20a3 based on the numbers of assignments of the image processing units in the print route. Specifically, the control unit 10a1 selects the combination of the first image processing unit 20a2 and the second image processing unit 20a3 in a manner of minimizing a sum of the numbers of assignments (step S410). Next, the control unit 10a1 increments the number of assignments of each image processing unit selected in step S410 by 1 (step S415).

Figure 16:
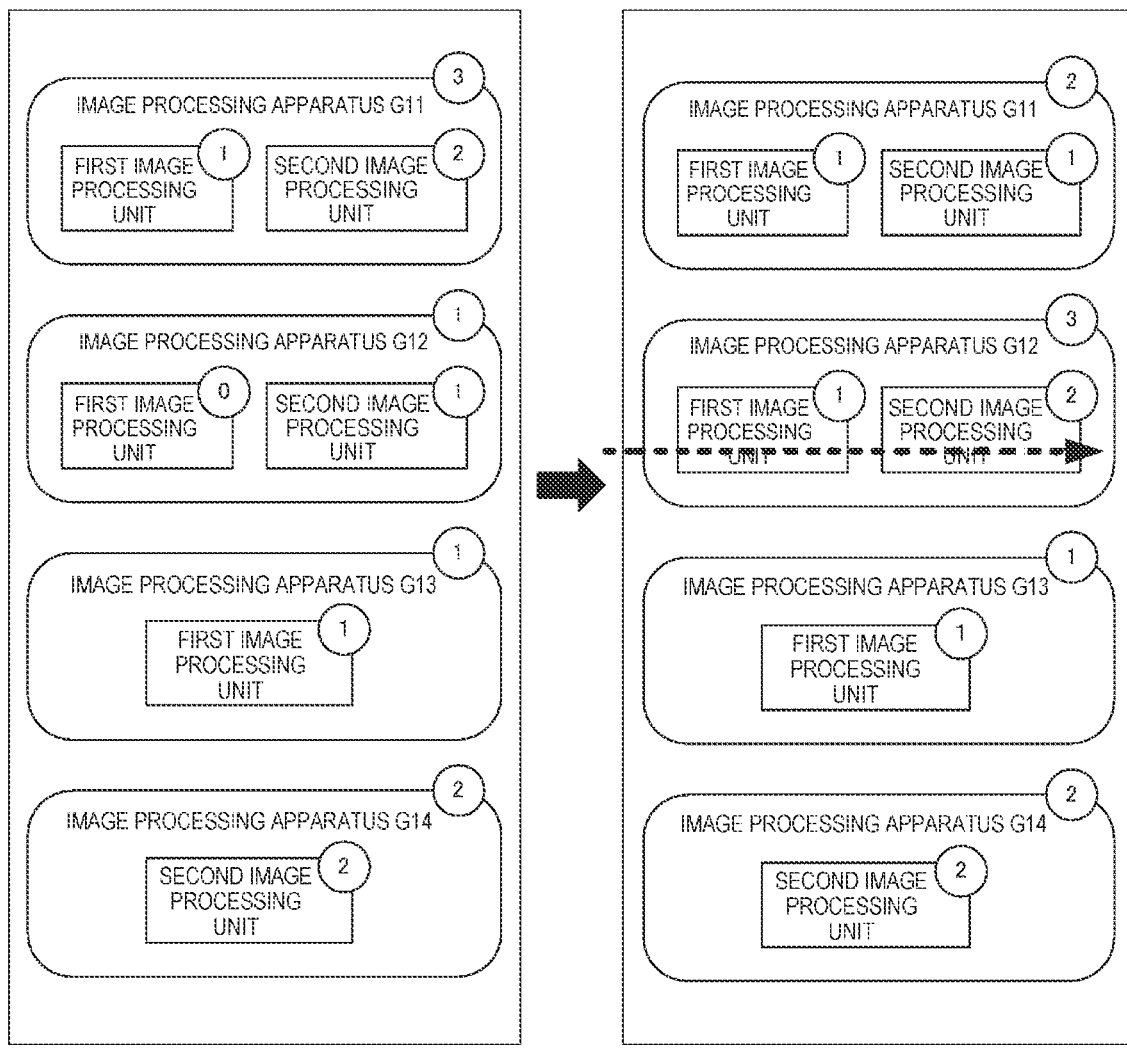
FIG. 16 is a schematic diagram of the number of assignments.

For example, as shown on a left side in FIG. 16, it is assumed that the numbers of assignments of the first image processing unit 20a2 and the second image processing unit 20a3 provided in an image processing apparatus G11 are 1 and 2, respectively. It is assumed that the numbers of assignments of the first image processing unit 20a2 and the second image processing unit 20a3 of an image processing apparatus G12 are 0 and 1, respectively. It is assumed that an image processing apparatus G13 includes only the first image processing unit 20a2 and the number of assignments is 1. An image processing apparatus G14 includes only the second image processing unit 20a3 and the number of assignments is 2.

In this case, the first image processing unit 20a2 of the image processing apparatus G12 and the second image processing unit 20a3 of the image processing apparatus G12 minimize a sum of the number of assignments of the first image processing units 20a2 and the number of assignments of the second image processing unit 20a3. Accordingly, a combination of the first image processing unit 20a2 of the image processing apparatus G12 and the second image processing unit 20a3 of the image processing apparatus G12 is selected. In this case, as shown on a right side in FIG. 16, the numbers of assignments of the first image processing unit 20a2 of the image processing apparatus G12 and the second image processing unit 20a3 of the image processing apparatus G12 are each incremented by 1.

Figure 17:
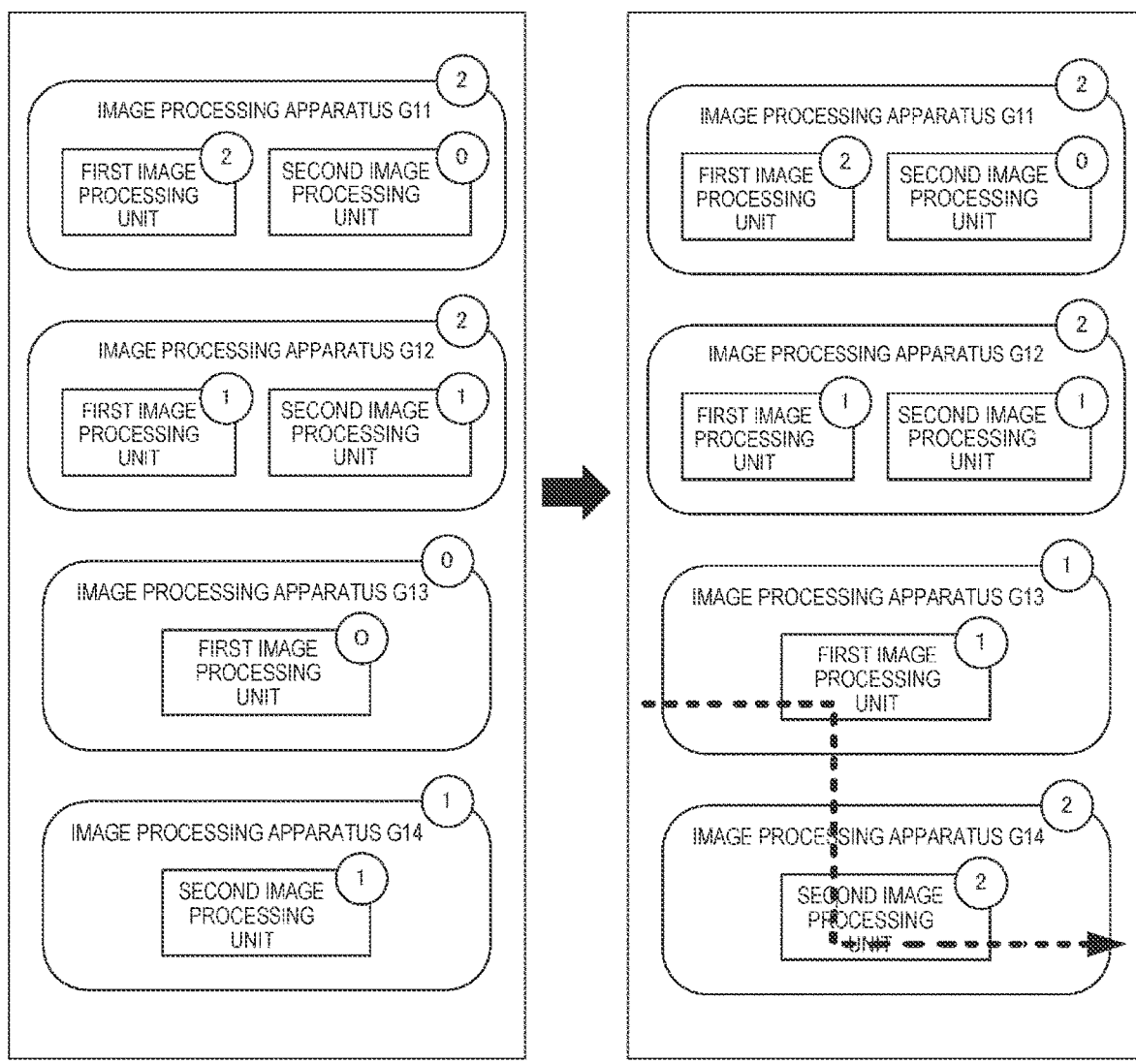
FIG. 17 is a schematic diagram of the number of assignments.

As shown on a left side in FIG. 17, when the number of assignments is assigned to each image processing unit, a combination of the first image processing unit 20a2 of the image processing apparatus G13 and the second image processing unit 20a3 of the image processing apparatus G14 is selected. Then, as shown on a right side in FIG. 17, the numbers of assignments of the first image processing unit 20a2 of the image processing apparatus G13 and the second image processing unit 20a3 of the image processing apparatus G14 are each incremented by 1.

In the example in FIG. 17, it is assumed that the number of assignments of the first image processing unit of the image processing apparatus G12 is 0 instead of 1. In this case, a sum of the numbers of assignments of the first image processing unit 20a2 of the image processing apparatus G12 and the second image processing unit 20a3 of the image processing apparatus G12 and a sum of the numbers of assignments of the first image processing unit 20a2 of the image processing apparatus G13 and the second image processing unit 20a3 of the image processing apparatus G14 are both equal to 1. In this way, when there are a plurality of combinations having a minimized sum of the numbers of assignments, the control unit 10a1 selects a combination of image processing units having a minimized number of the image processing apparatuses 20. That is, in the example in FIG. 17, a combination of the first image processing unit 20a2 of the image processing apparatus G12 and the second image processing unit 20a3 of the image processing apparatus G12 is selected. This is because, since the processing is performed in the same image processing apparatus 20, the processing is not affected by delay caused by the network.

As described above, the print route is determined. In this way, in the embodiment, the control unit 10a1 simply estimates a load on each image processing unit by referring to the number of assignments. Accordingly, it is possible to select an image processing unit with a lower load and to optimize overall performance of the image processing system 1 related to printing.

The description returns to FIG. 15. When the print route is determined by the processing up to step S415, next, the control unit 10a1 generates control information corresponding to the print instruction (step S420). Next, the control unit 10a1 transmits the control information to the image processing unit (step S425). Specifically, the control unit 10a1 transmits the control information of the distributed processing to the first image processing unit 20a2 to which the first image processing, which is an initial piece of image processing among the plurality of pieces of image processing for printing, is assigned. The first image processing unit 20a2 that receives the control information performs the first image processing based on the control information. When the first image processing is completed, the control information is transmitted to the second image processing unit 20a3 to which the second image processing is assigned, the second image processing is performed by the second image processing unit 20a3, and the print data is transmitted to the printing apparatus 30. In this way, the control unit 10a1 transmits the control information to cause the image processing unit in charge of the distributed processing to perform the image processing, thereby executing the distributed processing.

When the control apparatus 10 cannot communicate with the image processing apparatus 20 due to disconnection of the network or the like, the image processing apparatus 20 stops the image processing related to the control information transmitted from the control apparatus 10 that cannot communicate. Then, the image processing apparatus 20 subtracts 1 from the number of assignments of the image processing unit in which the image processing is stopped. Accordingly, it is possible to prevent the image processing unit from being occupied by the control apparatus 10 that cannot communicate. The image processing apparatus 20 periodically monitors the IP address of the control apparatus 10 and checks availability of communication.

(8) LICENSE

Next, a license will be described. In the embodiment, it is assumed that the rendering processing in the image processing in the image processing apparatus 20 is processing requiring an authenticated license. Therefore, in the image processing system 1, when a plurality of users use an image processing service, the total number of licenses owned by the plurality of users is the number of pieces of processing that can be simultaneously executed. The image processing system 1 according to the embodiment performs license management in order to implement efficient processing in which the first image processing including the rendering processing is executed to a maximum extent possible under restriction due to the total number of licenses.

Figure 18:
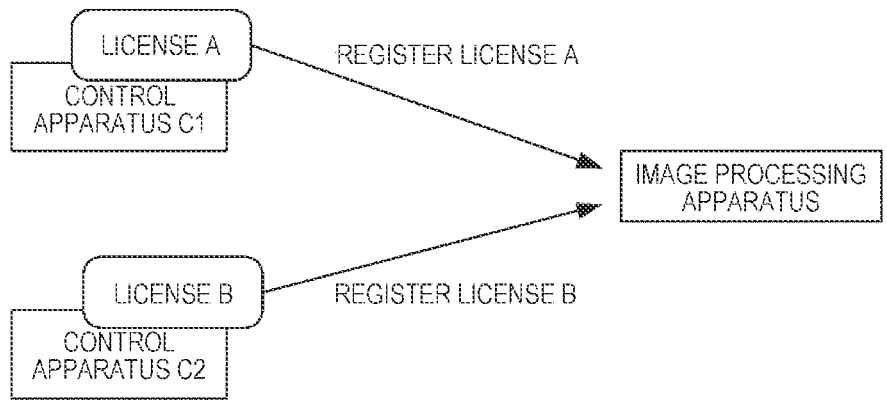
FIG. 18 is a schematic diagram of registration of a license.

It is assumed that the same number of licenses as the number of control apparatuses 10 used by the users are granted. For example, as shown in FIG. 18, when there are two control apparatuses C1 and C2 as the control apparatus 10 in the image processing system 1, two licenses, that is, licenses A and B are set. In this case, the control unit 10a1 of each control apparatus 10 first registers the license. Specifically, the license granted to the control apparatus 10 is registered in the image processing apparatus 20 connected to the control apparatus 10. Accordingly, in the image processing apparatus 20, license information for identifying the license and control apparatus information for identifying the control apparatus 10 that is a transmission source of the license are registered in the nonvolatile memory 20c in association with each other. The control apparatus information is the IP address of the control apparatus 10.

Accordingly, as shown in FIG. 18, when the license A is registered from the control apparatus C1 and the license B is registered from the control apparatus C2, the two licenses, that is, the license A and the license B are registered in the image processing apparatus 20. Although only one image processing apparatus 20 is shown in FIG. 18 for convenience of explanation, information on the license granted to the control apparatus 10 is registered in all the image processing apparatuses 20 connected to the control apparatus 10. When the image processing is executed by the first image processing unit, one license is assigned to the first image processing unit. In this way, the license assigned to the one image processing unit is prohibited from being assigned to another image processing unit. When the license is assigned to the image processing unit, the license is managed in a locked state, and when the license is not assigned to the image processing unit, the license is managed in an unlocked state.

Next, the assignment of the license to the image processing unit will be described with reference to FIG. 19. The control unit 10a1 of the control apparatus 10 transmits a license use request to the image processing apparatus 20. The license use request includes the license information for identifying the license and an access key. The access key is generated by the control unit 10a1 and stored in the nonvolatile memory 10c.

The image processing apparatus 20 that receives the license use request transmits a license lock request to the control apparatus 10 to which the license indicated by the license information is granted. The license lock request includes the license information and the access key.

Figure 19:
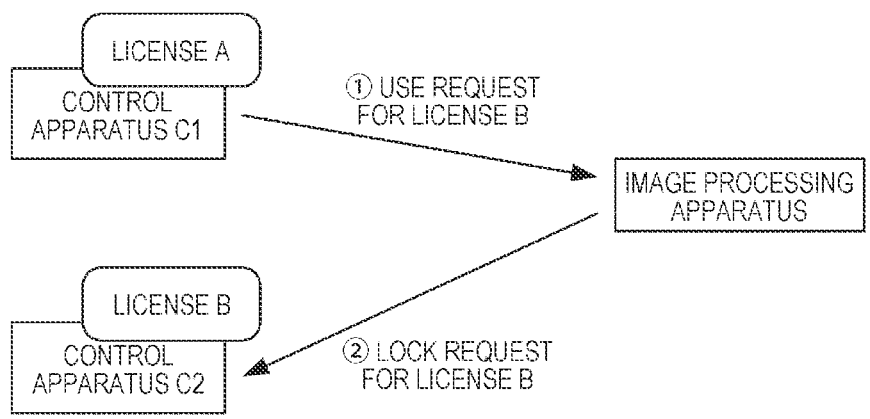
FIG. 19 is a schematic diagram of a license assignment.

Here, as shown in FIG. 19, a case where the control apparatus C1 transmits a use request for the license B will be described as an example. In this case, upon receiving the use request for the license B, the image processing apparatus 20 transmits the received use request for the license B to the control apparatus C2 to which the license B is granted.

When the license B is not assigned to any image processing, that is, in the unlocked state, the control apparatus C2 transmits use permission information as a response to the image processing apparatus 20. Then, the control apparatus C2 stores the access key provided in the use request in association with the license B. Then, the control apparatus C2 changes the license B to the locked state. Upon receiving the use permission information, the image processing apparatus 20 transmits the use permission information to the control apparatus C1.

On the other hand, when the license B is already assigned to the image processing, that is, in the locked state, the control apparatus C2 transmits use prohibition information. Upon receiving the use prohibition information, the image processing apparatus 20 transmits the use prohibition information to the control apparatus C1. In this case, the image processing apparatus 20 continues to periodically transmit the use request for the license B to the control apparatus C2 until the image processing corresponding to the license B is completed and the license B enters the unlocked state. When the license B enters the unlocked state, the control apparatus C2 stores the access key provided in the use request in association with the license B in response to the use request for the license B received from the image processing apparatus 20. Then, the control apparatus C2 changes the license B to the locked state again. In response to this, the image processing apparatus 20 receives the use permission information when the license B enters the unlocked state. Upon receiving the use permission information, the image processing apparatus 20 transmits the use permission information to the control apparatus C1.

After transmitting the license use request, the control unit 10a1 of the control apparatus 10 receives the use permission information. When the license is in the locked state, the use prohibition information is transmitted, the control unit 10a1 stands by until the license enters the unlocked state, and receives the use permission information after the license enters the unlocked state. Then, the control unit 10a1 assigns the license corresponding to the use permission information to the first image processing unit 20a2 in the print route.

Next, release of the license will be described with reference to FIG. 20. When the first image processing is completed by the first image processing unit 20a2, the image processing apparatus 20 including the first image processing unit 20a2 transmits the status data indicating that the first image processing is completed to the control apparatus 10. For example, when the control apparatus C1 shown in FIG. 19 transmits the control information to the image processing apparatus 20, the image processing is started, and when the processing is completed, the status data indicating the end of image processing is transmitted to the control apparatus C1.

Figure 20:
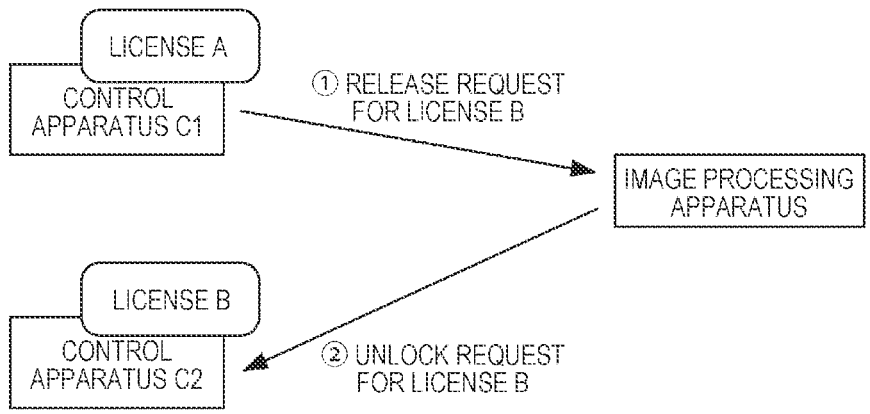
FIG. 20 is a schematic diagram of release of the license.

Upon receiving the status data indicating the end of image processing, the control apparatus C1 transmits a release request for the license B to the image processing apparatus 20 as shown in FIG. 20. The release request for the license B includes the access key generated when the use request for the license B is transmitted. Upon receiving the release request for the license B, the image processing apparatus 20 transmits an unlock request for the license B to the control apparatus C2. The unlock request includes the license information on the license B and the access key. Upon receiving the unlock request for the license B, the control apparatus C2 compares an access key stored in association with the license B with the access key in the unlock request. When the two access keys match each other, the control apparatus C2 changes the license B to the unlocked state. As described above, by managing the license, a use rate of the license can be improved in a system in which the license is shared as in the image processing system 1.

The control apparatus 10 may not be able to communicate with the image processing apparatus 20 due to disconnection of the network or the like. In the example in FIG. 19, when the license B is in the locked state and the control apparatus C2 and the image processing apparatus 20 cannot communicate with each other, the license B is changed to the unlocked state. Accordingly, it is possible to prevent the license from being occupied by the image processing apparatus 20 that cannot communicate. The control apparatus 10 periodically monitors the IP address of the image processing apparatus 20 and checks availability of communication.

As described above, in the image processing system 1 in the embodiment, when the printing apparatus 30 is selected as the setting target by the user, the image processing apparatus 20 associated with the selected printing apparatus 30 is displayed on the display 10d. When the image processing apparatus 20 displayed on the display 10d is selected, the selected image processing apparatus 20 is set as the candidate in charge of the distributed processing. Therefore, the image processing system 1 can assign an appropriate image processing apparatus according to apparatus installation environment.

The image processing system 1 determines a combination of image processing units in charge of the image processing as the distributed processing based on the number of assignments. Therefore, it is possible to select an appropriate combination according to a load state of each image processing unit in the image processing system 1 and to improve processing efficiency.

(9) APPENDIX

The above-described embodiment is an example for implementing the disclosure, and various other embodiments may be adopted. For example, the apparatus configuration of the image processing system is not limited to the configuration shown in FIG. 1. The control apparatus 10 and the image processing apparatus 20 may have a common configuration. Specifically, the control unit 10a1, the first image processing unit 20a2, and the second image processing unit 20a3 may be installed in computers, and each computer may function as any of the control apparatus 10 and the image processing apparatus 20. In this case, each computer includes the first image processing unit 20a2 and the second image processing unit 20a3, and a specific computer may be set to function as one of the first image processing unit 20a2 and the second image processing unit 20a3. In this case, the other image processing unit is set to not function.

The apparatuses shown in FIG. 1 may be a smaller number of terminals sharing functions or may be a larger number of terminals. For example, the image processing apparatus 20 and the printing apparatus 30 may be an integrated apparatus, and the control apparatus 10 or the image processing apparatus 20 may be implemented by a cloud computer.

The image processing system only needs to be a system including the plurality of image processing units that execute the image processing for printing in the printing apparatus, and the control unit that causes the plurality of image processing units to execute the image processing. Accordingly, another apparatus, for example, a printing apparatus, may be provided. The number of image processing units is not limited, and a plurality of control units and printing apparatuses may be provided.

The image processing unit only needs to be able to execute the image processing for printing in the printing apparatus, at least two types of image processing are sequentially executed during a period from when the print instruction is issued to when the printing is started, and there are two types of image processing units that perform the respective types of image processing. Three or more types of image processing may be sequentially executed during the period from when the print instruction is issued to when the printing is started, and in this case, information is also transmitted to third and subsequent image processing units based on the control information.

In the above-described embodiment, a plurality of computers function as the image processing units, but it is sufficient that one computer can execute one or more types of image processing units, and one computer may be able to execute two or more types of image processing units. One type of image processing unit may be executable in one computer, and two or more computers that can execute any type of image processing unit may co-exist.

The image processing unit is not limited to the configuration in which the first image processing unit performing rasterization processing and the like and the second image processing unit performing halftone processing and the like are distinguished from each other as described above, and, for example, there may be separate image processing units for layout processing and halftone processing.

The control unit only needs to be able to cause the plurality of image processing units to execute the image processing, and the control is executed based on the control information. Accordingly, the control unit does not need to control the distribution destination of the image processing after outputting the control information to the first image processing unit.

The control information only needs to include information indicating the input data, which serves as the processing target, and the image processing unit that performs the following processing on the processed output data. That is, the control information only needs to include information to be referred to at the time of inputting to and outputting from the image processing unit, and be configured such that the image processing sequentially proceeds with reference to the control information.

The information indicating the input data serving as the processing target in the control information only needs to be defined such that the image processing unit can acquire the input data based on the information and start the image processing. Accordingly, the information indicating the input data serving as the processing target may be the input data itself as in the above-described embodiment, or may be information indicating the storage location where the input data is stored.

The information indicating the image processing unit that performs the following processing on the processed output data in the control information only needs to be defined such that the image processing unit to which the output data is to be input can be specified based on the information. Accordingly, the configuration is not limited to the configuration in which the image processing unit to which the output data is to be input is specified by indicating the storage location associated with the image processing unit as in the above-described embodiment. For example, a configuration in which the image processing unit is specified by an ID of a computer where the image processing unit is installed or an ID associated with the image processing unit may be adopted. The input data and the output data may be data of any form, and a format thereof can be changed through the image processing by the image processing unit.

Each of the plurality of image processing apparatuses 20 provided in the image processing system 1 can transfer the image data after the second image processing is performed, that is, the print data, to another image processing apparatus 20 via the network. Therefore, in the setting processing of the image processing described with reference to FIG. 10, the control apparatus 10 may register all the image processing apparatuses 20 provided in the image processing system 1 as the image processing apparatus 20 available for instructing printing of the print data in the nonvolatile memory 10c in association with the printing apparatus 30. Accordingly, choices of the image processing units can be increased.

The control unit 10a1 of the control apparatus 10 only needs to determine the combination of the image processing units in charge of the distributed processing based on the number of assignments, and specific processing therefor is not limited to that in the embodiment. For example, the number of assignments may be multiplied by a weight. For example, when one piece of image processing is assigned to an image processing unit having a high processing capability, a number of assignments smaller than 1 may be given. Accordingly, an image processing unit having a high processing capability is more likely to be selected.

The disclosure is also applicable to a program and a method executed by a computer. The system, the program, and the method as described above may be implemented as a single apparatus, may be implemented using components provided in a plurality of apparatuses, each element may be provided in an apparatus different from the above-described apparatus, and various aspects may be provided. Changes can be made as appropriate, such as a part being software and a part being hardware. Further, the disclosure may be implemented as a recording medium of a program for controlling a system. Of course, the recording medium of the program may be a magnetic recording medium or a semiconductor memory, and the same is true for any recording medium to be developed in the future.

What is claimed is:

1. An image processing system comprising:
a processor configured to control distributed processing in which a plurality of image processors including a first image processor and a second image processor distributively perform a plurality of pieces of image processing for performing printing by a printing apparatus, wherein
the processor
acquires a number of assignments, which is a unit number of pieces of image processing assigned to each of the image processors, from a plurality of apparatuses including the image processors,
determines, based on the number of assignments, a combination of a plurality of the image processors in charge of the distributed processing, and
controls the determined image processors to execute the distributed processing,
when the combination of the image processors is selected, the processor transmits control information on the distributed processing to the first image processor that performs the image processing first among the selected image processors,
when the first image processor completes the image processing, the second image processor that performs the image processing second among the selected image processors starts the image processing based on the control information, and
when the selected image processors complete the image processing, a printing apparatus acquires a print data processed by the first image processor and the second image processor.

2. The image processing system according to claim 1, wherein
the processor selects the combination having a minimized sum of the numbers of assignments assigned to the plurality of image processing units in charge of the distributed processing.

3. The image processing system according to claim 2, wherein
when there are a plurality of the combinations having a minimized sum of the numbers of assignments assigned to the image processing units in charge of the distributed processing, the processor selects the combination having a minimized number of the apparatuses including the image processing units.

4. The image processing system according to claim 1, wherein
when the combination of the image processing units is selected, the processor transmits the control information on the distributed processing to the image processing unit that performs the image processing first among the selected image processing units,
the control information includes image data, which is a processing target, and information for identifying the plurality of image processing units in the determined combination, and
the image processing unit that receives the control information performs the image processing based on the control information.

5. The image processing system according to claim 1, wherein
when the printing apparatus is specified, the processor determines, based on the number of assignments, the image processing units in charge of the distributed processing from a plurality of the image processing units registered in association with the specified printing apparatus.

6. A control apparatus comprising:
a processor configured to control distributed processing in which a plurality of image processors including a first image processor and a second image processor distributively perform a plurality of pieces of image processing for performing printing by a printing apparatus, wherein
the processor
acquires a number of assignments, which is a unit number of pieces of image processing assigned to each of the image processors, from a plurality of apparatuses including the image processors,
determines, based on the number of assignments, a combination of a plurality of the image processors in charge of the distributed processing,
controls the determined image processors to execute the distributed processing,
when the combination of the image processor is selected, the processor transmits control information on the distributed processing to the first image processor that performs the image processing first among the selected image processors, when the first image processor completes the image processing, the second image processor that performs the image processing second among the selected image processors starts the image processing based on the control information, and when the selected image processors complete the image processing, a printing apparatus acquires a print data processed by the first image processor and the second image processor.

7. A non-transitory computer-readable storage medium storing a program executed by a computer of a control apparatus that controls distributed processing in which a plurality of image processors including a first image processor and a second image processor distributively perform a plurality of pieces of image processing for performing printing by a printing apparatus, the program causing the computer to:

acquire a number of assignments, which is a unit number of pieces of image processing assigned to each of the image processing units, from a plurality of apparatuses including the image processing units;

determine, based on the number of assignments, a combination of a plurality of the image processing units in charge of the distributed processing; and control the determined image processing units to execute the distributed processing, wherein when the combination of the image processor is selected, the processor transmits control information on the distributed processing to the first image processor that performs the image processing first among the selected image processors, when the first image processor completes the image processing, the second image processor that performs the image processing second among the selected image processors starts the image processing based on the control information, and when the selected image processors complete the image processing, a printing apparatus acquires a print data processed by the first image processor and the second image processor.

* * * * *